US008005723B1

(12) United States Patent
Sirota et al.

(10) Patent No.: US 8,005,723 B1
(45) Date of Patent: Aug. 23, 2011

(54) PROVIDING MULTIPLE CONFIGURABLE USAGE MODELS FOR AVAILABLE SERVICES

(75) Inventors: Peter Sirota, Seattle, WA (US); Guarav D. Ghare, Seattle, WA (US); Don Johnson, Seattle, WA (US); Tushar Jain, Bellevue, WA (US); Robert Frederick, Seattle, WA (US); Ashish Agrawal, Bangalore (IN); Jeffrey Barr, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/825,241

(22) Filed: Jun. 28, 2010

Related U.S. Application Data

(60) Division of application No. 11/454,622, filed on Jun. 15, 2006, now Pat. No. 7,801,771, which is a continuation-in-part of application No. 10/766,697, filed on Jan. 27, 2004, now Pat. No. 7,433,835.

(60) Provisional application No. 60/782,739, filed on Mar. 15, 2006.

(51) Int. Cl.
*G06Q 30/00* (2006.01)
(52) U.S. Cl. .................................................. 705/26.1
(58) Field of Classification Search .............. 705/26, 705/26.1
See application file for complete search history.

(56) References Cited

U.S. PATENT DOCUMENTS

| 5,815,665 A | 9/1998 | Teper et al. ............. 395/200.59 |
| 5,826,244 A | 10/1998 | Huberman ..................... 705/37 |
| 5,892,900 A | 4/1999 | Ginter et al. ................. 395/186 |
| 6,078,906 A | 6/2000 | Huberman ..................... 705/37 |
| 6,167,383 A | 12/2000 | Henson ........................ 705/26 |
| 7,502,760 B1 | 3/2009 | Gupta ........................... 705/66 |
| 7,555,547 B2 | 6/2009 | Singh et al. .................. 709/224 |
| 7,606,832 B2 | 10/2009 | Chafle et al. ............... 707/104.1 |
| 7,617,174 B2 | 11/2009 | Chen et al. .................... 706/62 |
| 7,665,064 B2 | 2/2010 | Able et al. ................... 717/117 |
| 7,783,499 B2 | 8/2010 | Boughannam ............... 705/1.1 |
| 2002/0120461 A1 | 8/2002 | Kirkconnell-Ewing et al. . 705/1 |
| 2002/0120519 A1 | 8/2002 | Martin et al. ................ 705/21 |
| 2003/0005002 A1 | 1/2003 | Chen et al. .................. 707/515 |
| 2003/0163513 A1 | 8/2003 | Schaeck et al. .............. 709/201 |
| 2003/0188017 A1 | 10/2003 | Nomura ....................... 709/241 |
| 2003/0195813 A1 | 10/2003 | Pallister et al. ............... 705/26 |
| 2004/0122926 A1 | 6/2004 | Moore et al. ................ 709/223 |

(Continued)

OTHER PUBLICATIONS

"Metering and Accounting for Web Services" IBM®, Jul. 2001, retrieved from http://www-106.ibm.com/developerworks/library/ws-maws/, 6 pages.

(Continued)

*Primary Examiner* — Amee A Shah
(74) *Attorney, Agent, or Firm* — Seed IP Law Group PLLC

(57) ABSTRACT

Techniques are described for facilitating interactions between computing systems, such as in accordance with usage models that are configured for available services by the providers of the services. In some situations, the services are Web services, and an electronic Web service ("WS") marketplace is provided via which third-party WS providers make their WSes available to third-party WS consumers who purchase access to those WSes via the electronic marketplace based on configured usage models selected by the consumers. Some or all of the one or more usage models configured for an available WS may each have associated use prices and/or non-price use conditions, and if so access to those WSes using those usage models may be provided only if a consumer requesting access provides appropriate payment and otherwise satisfies the specified use conditions for a selected usage model.

20 Claims, 11 Drawing Sheets

U.S. PATENT DOCUMENTS

| | | |
|---|---|---|
| 2004/0136027 A1 | 7/2004 | Zehler .......................... 358/1.15 |
| 2004/0176988 A1 | 9/2004 | Boughannam .................... 705/4 |
| 2004/0205613 A1 | 10/2004 | Li et al. ......................... 715/523 |
| 2004/0215550 A1 | 10/2004 | Preist et al. ...................... 705/37 |
| 2004/0243583 A1 | 12/2004 | Olsen .............................. 707/10 |
| 2004/0243697 A1 | 12/2004 | Otsuka et al. ................. 709/223 |
| 2005/0065879 A1 | 3/2005 | Birch et al. |
| 2005/0096960 A1 | 5/2005 | Plutowski et al. ................. 705/8 |
| 2005/0114437 A1 | 5/2005 | Creamer et al. ............. 709/203 |
| 2005/0125389 A1 | 6/2005 | Hazzard et al. ................... 707/3 |
| 2005/0228517 A1 | 10/2005 | Tomita ............................ 700/87 |
| 2005/0256882 A1 | 11/2005 | Able et al. ...................... 707/10 |
| 2006/0026552 A1 | 2/2006 | Mazzitelli et al. ............ 717/101 |
| 2006/0190745 A1 | 8/2006 | Matsushima et al. ......... 713/300 |

OTHER PUBLICATIONS

"NTT Com to Launch Asia's First UDDI Registry on Oct. 9" Oct. 8, 2002, NTT Communications, retrieved Sep. 9, 2005, from http://www.ntt.com/release_e/news02/0010/1008.html, 3 pages.

"The Bowstreet™ Business Web Exchange Fuels B2B Revolution With First-of-its-Kind 'Web Services' Marketplace" Mar. 16, 2000, Bowstreet.com Inc., retrieved Sep. 9, 2005, from http://web.archive.org/web/20010219033902/http://www.bowstreet.com/news/press_release..., 4 pages.

"The Web Services Architect: Catalysts for Fee-Based Web Services" IBM®, Nov. 2001, retrieved from http ://www-106.ibm.com/developerworks/library/ws-arc6/, 7 pages.

"Web Service Use Case" ContentGuard Holdings, Inc., retrieved Aug. 9, 2005, from http://www.contentguard.com/reference/docs/SimpleWebServiceExampleContent.htm. 4 pages.

"Web Service Use Case: Travel Reservation—Use Case May 5, 2002" W3C®, May 2002, retrieved Aug. 9, 2005, from http://www.w3.org/2002/06/ws-example, 9 pages.

"Web Services Architecture Usage Scenarios—W3C Working Draft Jul. 30, 2002" W3C®, Jul. 2002, retrieved Aug. 2, 2005, from http://www.w3.org/TR/2002/WD-ws-arch-scenarios-20020730/, 78 pages.

"Web Services Marketplace" retrieved Sep. 9, 2005, from http://web.archive.org/web/20010404230735/www/epicentric.com/solutions/mkt.jsp, 4 pages.

Actional™, The Web Services Management Platform: Managing the Impact of Change in an Enterprise Web Services Network—Mar. 2003, retrieved Nov. 7, 2003, from http://www.actional.com/downloads/products/managing.enterpriseweb.services.network.pdf, 26 pages.

Actional™, Web Services Management Platform, retrieved Nov. 7, 2003, from http://www.actional.com/products/web_services/index.asp, 3 pages.

Albrecht et al., "Marketplace and Technology Standards for B2B. Ecommerce: Progress and Challenges" MIS Quarterly Special Issue on Standard Making, International Conference on Information Systems, Dec. 2003, Seattle, WA, pp. 188-209, 22 pages.

Allidex, Frequently Asked Questions, retrieved Nov. 4, 2003, from http://www.allidex.com/faq.html, 4 pages.

Amazon.com, Inc. Developers: Build Solutions for Amazon Partners, retrieved Nov. 4, 2003, from http://www.amazon.com/gp/browse.html/ref=sc_bb_1_1/104-7530911-9659969?no=3435361&me=A3.6.L, 2 pages.

Amazon.com, Inc. Web Services FAQ's, retrieved Nov. 4, 2003, from http://www.amazon.com/gp/browse.html/ref=sc_bb_1_0/104-7530911-9659969?no=3435361&me=A3.6.L, 11 pages.

Amazon.com, Inc. Associates: Enhance Your Site Using Web Services, retrieved Nov. 4, 2003, from http://www.amazon.com/gp/browse.html/ref=sc_bb_1_1/104-7530911-9659969?no=3435361& me=A3.6.L, 2 pages.

Amazon.com, Inc. Sellers and Vendors: Sell More Using Web Services, retrieved Nov. 4, 2003, from http://www.amazon.com/gp/browse.html/ref=sc_bb_1_1/104-7530911-9659969?no=3435361& me=A3.6.L, 1 page.

Amazon.com, Inc. Web Services, retrieved Nov. 4, 2003, from http://www.amazon.com/gp/browse.html/104-7530911-9659969?node=3435361, 2 pages.

Binstock, "Staking New Territory, Breaking New Ground" retrieved Sep. 9, 2005, from http://archive.devx.com/javaSR/articles/binstock/binstock.asp, 6 pages.

Box et al., "Web Services Policy Framework (WS-Policy)" Jun. 2, 2003, retrieved Sep. 12, 2005, from ftp://www6.software.ibm.com/software/developer/library/ws-policy2003.pdf, 21 pages.

Brown, "Epicentric Unveils Web Services E-Hub" Mar. 21, 2001, Line56.com, retrieved Sep. 9, 2005, from http://www.line56.com/print/default.asp?ArticleID=2287, 2 pages.

Bunting et al., "Web Services Composite Application Framework (WS-CAF)" Jul. 28, 2003, retrieved Sep. 12, 2005, from http://www.oasis-open.org/committees/download.php/4343/WS-CAF%20Primer.pdf, 23 pages.

Burbeck, "The Tao of E-Business Services—The Evolution of Web Applications Into Service-Oriented Components With Web Services" Oct. 2000, IBM®, http://www.4.ibm.com/software/developer/library/ws-tao/index.html, 13 pages.

Business Wire, "Desktop.com Introduces Devtop, the First Integrated Platform for Building, Deploying, and Distributing Web-Base Applications" Jun. 26, 2000, retrieved Sep. 8, 2005, from http://www.findarticles.com/p/articles/mi_m0EIN/is_2000_June_26/ai_62915951/print, 2 pages.

Clark, "Business Architecture for a Web Services Brokerage—Understanding the Business Context of Web Services" Aug. 1, 2001, retrieved Aug. 2, 2005, from http://www.webservicesarchitect.com/content/articles/clark/01print.asp, 5 pages.

CPA2Biz, Inc., "New Rivio Business Services Suite" Apr. 18, 2001, retrieved Sep. 8, 2005, from https://www.epa2biz.com/Corp/Press+Releases/PR_WebTools_18APR01.htm, 3 pages.

CPA2Biz, Inc., "Verizon Unveils Rivio Web Services Suite for Small Business Customers" May 29, 2001, retrieved Sep. 22, 2005, from https://www.cp2biz.com/Corp/Press+Releases/PR_VERIZON_29MAY01.htm, 3 pages.

E2OPEN™, E2open Products, retrieved Nov. 7, 2003, from http://www.e2open.com/products/, 3 pages.

E2OPEN™, The E2open Integration Platform, retrieved Nov. 7, 2003, from http://www.e2open.com/downloads/e2open_integration_platform_datasheet.pdf, 5 pages.

ebizQ, Product Quicktake, retrieved Nov. 7, 2003, from http://www.ebizq.net/reports/1884.html?download=1, 2 pages.

Grand Central™ Communications website, retrieved Nov. 6, 2003, from http://www.grandcentral.com/products/, 2 pages.

Grand Central™ Communications, Frequently Asked Questions, retrieved Nov. 6, 2003, from http://www.grandcentral.com/products/faqs/index_html, 5 pages.

Irani, "Web Services Intermediaries—Adding Value to Web Services" Nov. 21, 2001, retrieved Aug. 2, 2005, from http://www.webservicesarchitect.com/content/articles.irani07print.asp, 5 pages.

Jamcracker, Inc., "Jamcracker announces Pivot Path: Fully integrated software suite for Identity Management" Nov. 11, 2003, retrieved Sep. 12, 2005, from http://web.archive.org/web/20040607054618/http://jamcracker.com/pivot_path_release.pdf, 2 pages.

Khare, "Whiz-Bangery, Indeed: Primordial's WSBANG" Nov. 16, 2001, retrieved Sep. 9, 2005, from http://lair.xent.com/pipermail/fork/2001-November/006569.html, 2 pages.

Lee, "StrikeIron's Hot for Web Services" SD Times, Jun. 1, 2004, retrieved Sep. 12, 2005, from http://www.strikeiron.com/doc/SDTimes060104.pdf, 1 page.

Levitt, "From EDI to XML and UDDI: A Brief History of Web Services" Oct. 1, 2001, Information Week, retrieved Sep. 9, 2005, from http://www.informationweek.com/story/IWK20010928S0006, 3 pages.

Oasis, UDDI.org, retrieved Sep. 8, 2005, from http://www.uddi.org/find.html, 2 pages.

Radding, "Generating Revenue from Web Services—Six Vendors With the Right Tools" Jan. 20, 2003, retrieved from, http://72.14.207.104/search?q=cache:W5EXBA4Lr54J:home.comcast.net/~alanradding/iaws.pdf+generating+revenue+from+web+services+radding&hl=en&gl=us&ct=cInk&cd=3, 4 pages.

Sabre Travel Network, Sabre Travel Network Launches Web Services Capabilities for Agents, Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.

SalCentral, Subscription of Web Services, Oct. 5, 2003, retrieved Sep. 7, 2005, from http://web.archive.org/web/20031005075820/www.salcentral.com/salnet/wpsubws.htm, 5 pages.

SalCentral, The Napster of Web Services, Oct. 4, 2003, retrieved Sep. 7, 2005, from http://web.archive.org/web/20031004143406/www.salcentral.com/salnet/webservicesnapster.asp, 2 pages.

SalCentral, WSDL, SOAP and Web Services and Quality Assurance and promotion, Oct. 4, 2003, retrieved Sep. 7, 2005, from http://web.archive.org/web/20031004143940/www.salcentral.com/salnet/webserviceswhat.asp, 2 pages.

SalCentral, WSDL, SOAP, Web Services Search Engine and Web Service Tracking, Oct. 11, 2003, retrieved Oct. 6, 2005, from http://web.archive.org/web/20031011101544/www.salcentral.com/salnet/webserviceswsdlne.asp, 1 page.

Samtani et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.

Schofield, "The Third Era Starts Here" The Guardian, May 29, 2003, retrieved Nov. 4, 2003, from http://www.guardian.co.uk/print/0,3858,4678440-110837,00.html, 3 pages.

Siddiqui, "UDDI Based Electronic Marketplaces—Easier Integration With UDDI and WSDL" Feb. 20, 2002, retrieved Aug. 2, 2005, from http://www.webservicesarchitect.com/content/articles/siddiqui02print.asp, 4 pages.

Smith, "Striking While the Iron is Red Hot: StrikeIron Unveils Its Web Network" LocalTechWire, Jun. 25, 2004, retrieved Sep. 22, 2005, from http://www.localtechwire.com/article.cfm?u=8509, 3 pages.

SoftwareMarkets.com, Frequently Asked Questions from Developers, Sep. 18, 2000, retrieved Sep. 8, 2005, from http://web.archive.org/web/20000918003355/www.softwaremarkets.com/info/faqdevs.html, 3 pages.

Sterling Commerce, Sterling Information Broker, retrieved Nov. 10, 2003, from http://www.sterlingcommerce.com/PDF/Solutions/SC0040.InfoBrokerOver.6-02.pdf, 4 pages.

Sterling Commerce, Sterling Information Broker, retrieved Nov. 10, 2003, from http://www.sterlingcommerce.com/solutions/em/commerce/iibs.html, 3 pages.

StrikeIron, Inc., "StrikeIron Launches the Web Services Business Network" Jun. 23, 2004, retrieved Sep. 8, 2005, from http://www.strikeiron.com/news/si_lauches.aspx, 3 pages.

StrikeIron, Inc., "StrikeIron Web Services Business Network Overview" retrieved Sep. 12, 2005, from http://www.strikeiron.com/doc/StrikeIronWebServicesBusinessNetworkOverview.pdf, 24 pages.

Taft, "Start-Up Presents ASP Opportunity for Java Developers" CRN, Jul. 31, 2000, retrieved Sep. 20, 2005, from http://www.crn.com/sections/breakingnews/breakingnews.jhtml?articleId=18834381, 3 pages.

Tolksdorf et al., "A Web Service Market Model Based on Dependencies" retrieved Sep. 9, 2005, from http://www.wiwiss.fu-berlin.de/suhl/bizer/pub/p49-tolksdorf.html, 4 pages.

UNISYS, Web Service Marketplace, retrieved Nov. 4, 2003, from http://www.unisysfsp.com/default.aspx?catID+16. 2 pages.

W3C, "WS Choreography Model Overview" Mar. 24, 2004, retrieved Sep. 8, 2005, from http://www.w3.org/TR2004/WD-ws-chor-model-20040324/, 35 pages.

Waldspurger et al., "Spawn: A Distributed Computational Economy" May 1989, Xerox Palo Alto Research Center, pp. 1-32, 32 pages.

Web Services Architect, Web Services Resources, retrieved Nov. 6, 2003, from http://webservicesarchitect.com/resources.asp, 6 pages.

WestGlobal mScape™, Web Services Business Management System, retrieved Nov. 7, 2003, from http://www.westglobal.com/downloadable_media/mspace_literature.zip, 20 pages.

WestGlobal, Products—Overview, retrieved Nov. 7, 2003, from http://www.westglobal.com/products/mspace_overview.htm, 3 pages.

WESTBLOBAL, Products—Revenue Management Module, retrieved Nov. 7, 2003, from http://www.westglobal.com/products/mscpace_revman.htm, 3 pages.

XMethods website, retrieved Nov. 6, 2003, from http://www.xmethods.net/, 3 pages.

ZapThink, LLC, ZapThink Briefing Note—Oct. 8, 2002, retrieved Nov. 7, 2003, from http://www.grandcentral.com/assets/docs/GC.zapthink_report.pdf, 5 pages.

"Interkeel and Techspan Create E-Business Solutions Using Web Services" PR Newswire, May 30, 2001, 3 pages.

Benatallah et al., "Declarative Composition and Peer-to-Peer Provisioning of Dynamic Web Services" Proceedings of the 18th International Conference on Data Engineering (ICDE'02), 2002, 12 pages.

Kiwata et al., "Scenario-based Service Composition Method in the Open Service Environment" Proceedings of the 5th International Symposium on Autonomous Decentralized Systems, 2001, 6 pages.

Gayek P. et al., "A Web Content Serving Utility," 2004, retrieved on May 18, 2011, from http://proquest.umi.com/pqdweb?index=1&did=574871991&SrchMode=1 . . . , 34 pages.

Example Customer Search Results From Web Store ZZZ

Search Results for "Map" in Item Type "Web Services"

| 111 WS Category | 112 Item Name | 113 Item Source | 114 Item Price | 115 Item Conditions Of Use | 116 Item ID | 117 Item Description |
|---|---|---|---|---|---|---|
| Mapping Services: 15 matches | | | | | | |
| 110a | AAA Street Maps By Street Address | WS Provider AAA | $0.05/use or $500/month | max uses/month=30000 | 0001342133 | Provides GIF images at up to 100M/inch |
| 110b | AAA Street Maps By Latitude/Longitude | WS Provider AAA | $0.08/use | available to subscribers to AAA GPS service | 0009287341 | Provides GIF images at up to 100M/inch |
| 110c | Driving Directions BBB | WS Provider BBB | $200/month | subject to Terms at www.bbb7.com/TC.htm | S072086133 | Textual driving directions and overview map |
| 110d | Driving Directions ZZZ | Web Store ZZZ | $0.05/use | . | 9874933245 | Textual driving directions for U.S. street addresses |
| 110e | Topographical Maps (high resolution) | WS Provider AAA | $0.10/use | . | 2987238765 | High resolution JPEG images at up to 30M/inch |
| 110f | Topographical Maps (low resolution) | WS Provider AAA | $0.02/use | . | 2981234778 | 640x480 resolution JPEG images at 100M/inch |
| 110g | see all matches in Mapping Services | | | | | |
| Scientific DBs: 3 matches | | | | | | |
| 110h | Human Genome Maps | WS Provider CCC | $0.01/use | non-commercial use only | 7813292254 | Genetic map information |
| 110i | see all matches in Scientific DBs | | | | | |
| Weather Services: 1 match | | | | | | |
| 110j | Live Weather Maps | Web Store ZZZ | $1/100 uses | not for use in composite WSs | 4397234563 | Current weather service maps worldwide |
| ... | | | | | | |

*FIG. 1A*

Example Web Service Registration Screen

Welcome, Web Service Provider DEF! Provide the information below to register a new Web Service available to customers of Web Store ZZZ. — 131

1. Specify a name for your Web Service being registered. — 133

| Current Location Maps For Portable Devices |

2. Optionally specify one or more terms related to the Web Service. — 134

| map, wireless location, portable |

3. Specify one or more usage prices for the Web Service.

| Usage Type | Restrictions | Price | |
   |---|---|---|---|
   | per use | | $1 | - 135a |
   | per month | maximum 500 uses/day | $4000 | - 135b |
   | per 1000 uses | | $800 | - 135c |
   | ⋮ | | | |

} 135

4. Specify any non-default conditions of use for the Web Service. — 136

|  |

5. Specify a description of the Web Service for customers. — 137

| For customers having portable devices whose location can be automatically determined (including GPS capabilities and most current cell phones), this Web Service includes a downloadable Java applet that can automatically retrieve and display a map of your current location upon request. |

| Register Web Service | — 139

*FIG. 1C*

Example Web Services Information Screen

Web Services

| Top Web Services | WS Rank | WS Rating | Similar WSes | Customers Who Liked This WS Also Liked These WSes |
|---|---|---|---|---|
| ⋮ | | | | |
| Driving Directions ZZZ | 11 | ●●●●○ based on 1723 reviews | Driving Directions BBB, ... | AAA Street Maps By Street Address, ... |
| Live Weather Maps | 12 | ●●●●● based on 517 reviews | - | Topographical Maps (high resolution) |
| ⋮ | | | | |

140, 140a, 140b, 141, 142, 143

Below are recommended Web Services for you, Customer JKL!

145

| Web Service | WS Price | WS Provider | | | |
|---|---|---|---|---|---|
| Human Genome Maps | $0.01/use | WS Provider CCC | ... | Add to Shopping Cart OR Subscribe Now | |
| Live Weather Maps | $1/100 uses | Web Store ZZZ | | Add to Shopping Cart OR Subscribe Now | |
| ⋮ | | | | | |

145a, 145b, 146, 147

Write your online review of the selected Web Service } 148

Customer Reviews
●●●●● Great Value!!, October 4, 200X
Reviewer: Customer MMM
Not only does this WS provide accurate and up-to-date information, it is a great value with its low per-use cost and lack of restrictive usage conditions!
⋮

} 149

*FIG. 1D*

PROVIDING MULTIPLE CONFIGURABLE USAGE MODELS FOR AVAILABLE SERVICES

CROSS-REFERENCE TO RELATED APPLICATIONS

This application is a divisional application of co-pending U.S. patent application Ser. No. 11/454,622, filed Jun. 15, 2006 and entitled "Providing Configurable Usage Models For Available Services," which is hereby incorporated herein by reference. U.S. patent application Ser. No. 11/454,622 is a continuation-in-part of U.S. patent application Ser. No. 10/766,697, filed Jan. 27, 2004 and entitled "Providing A Marketplace For Web Services," which is hereby incorporated by reference in its entirety.

This application also claims the benefit of provisional U.S. Patent Application No. 60/782,739, filed Mar. 15, 2006 and entitled "Providing Configurable Usage Models For Available Services," which is hereby incorporated by reference in its entirety.

TECHNICAL FIELD

The following disclosure relates generally to facilitating use of computer-implemented services in accordance with configurable usage models specified by the providers of those services.

BACKGROUND

Various mechanisms exist to allow computers and executing software applications to interact. For example, remote procedure call ("RPC") protocols have long existed that allow a program on one computer to cause a program on another computer to be executed, and various object-oriented architectures such as CORBA ("Common Object Request Broker Architecture") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), referred to as Web services.

Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Although Web services allow various applications and computers to interact, the current implementations and uses of Web services have various problems. For example, current Web service implementations are typically designed with only a very limited number of predefined applications interacting, and do not typically address a variety of issues for wide-scale interaction of providers and potential consumers of Web services. In addition, current Web service implementations do not typically provide effective means for potential consumers to discover or locate Web services that are desired or that may be of interest, such as via current UDDI-based implementations that may identify a connection point for one or more Web services but that do not typically provide any of a variety of other types of information related to the Web services to assist potential consumers (e.g., indications of usage by others, such as a ranking relative to other Web services; indications of comments and/or reviews by others; information related to the past provision of the Web service and/or the provider of the Web service, such as average up-time and response time; etc.). Current Web service implementations also do not typically provide sufficient assurance to potential consumers that prospective providers of Web services will reliably and accurately provide desired Web services, do not typically provide sufficient security for providers of Web services to ensure that their Web services will be made available only to authorized consumers and only in accordance with any conditions specified by the providers, do not typically provide easy-to-use mechanisms to allow Web service providers to collect specified payment for the use of their Web services by consumers, do not typically allow Web service providers to configure multiple usage models for their Web services, do not typically allow Web service providers to manage and monitor the use of their Web services, do not typically allow Web service consumers to monitor the use of provided Web services on their behalf, etc.

Thus, it would be beneficial to provide a solution that addresses these and other problems associated with the use of Web services and/or that otherwise facilitates the interaction of computer systems and executing applications.

BRIEF DESCRIPTION OF THE DRAWINGS

FIGS. 1A-1D illustrate examples of a user interface for Web service provider users and Web service consumer users to interact with an embodiment of a Web Services Marketplace ("WSM") system.

DETAILED DESCRIPTION

Figure 1B:
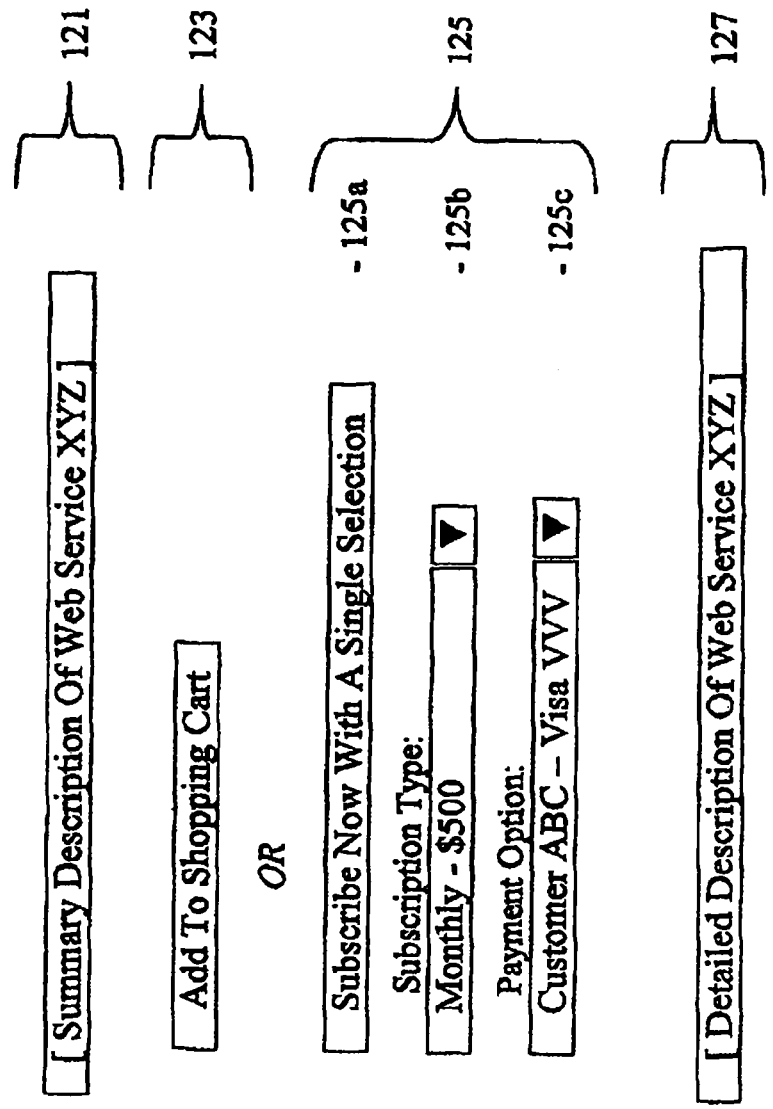

Techniques are described for facilitating interactions between computing systems, such as by in some embodiments providing an electronic Web service ("WS") marketplace via which third-party WS providers make their WSes available to third-party WS consumers who locate and purchase access to those WSes via the electronic marketplace. In at least some embodiments, the electronic marketplace provides a variety of types of pricing models and other types of use conditions that service providers may configure for their services in order to control use of the services by others. For example, a service provider may create one or more configured usage models for each service, which consumers may then select in order to obtain access to the service in accordance with the selected usage model—as discussed in greater detail below, each such usage model may contain pricing information and various types of use conditions and restrictions in at least some embodiments. In addition, in some embodiments a consumer of a first service may be a second service or an application program that provides functionality to end-users, such as functionality that includes access to the first service or other functionality that is based on such access. More generally, in at least some embodiments at least some of the services that are provided may be remotely invocable services other than Web services, the provided services may be made available in manners other than via an electronic marketplace, and at least some of the described techniques may be automatically performed by a computer-implemented facility.

In some embodiments, an electronic WS marketplace ("WSM") allows third-party WS providers to register their WSes with the electronic marketplace so as to make those WSes available to some or all WSM users who are potential consumers of the WSes. In particular, in some embodiments, a WS provider may specify pricing information and/or other WS use conditions at the time of registration of a WS for each of one or more usage models being configured for the WS. The WS providers also may specify the manner(s) in which their WSes are to be invoked (e.g., by supplying an appropriate WSDL or related information for the WSes), as well as various description information about their WSes that may be provided to potential consumers to assist them in their determination of whether to use the WS. Once WSes have been registered at the WSM, they can be made available to potential WS consumers in various ways in accordance with any specified pricing and use condition information, as discussed in greater detail below. In some embodiments, a WS provider may also need to first register with the WSM as a user before registering their WSes (e.g., to provide contact information, information on how payments to the WS provider are to be made, etc.).

As discussed in greater detail below, various types of use prices may be specified for WS usage models by service providers, such as based on predefined use price types provided by the WSM. For example, types of use prices may in at least some embodiments include a price to be charged on a per-use basis for each use, a price for a subscription that is valid for a specified length of time and/or number of uses, tiered pricing to reflect different costs for different volumes of use, multiple related prices to reflect specified criteria or conditions (e.g., different prices for peak and off-peak use, or for different quality-of-service levels provided), a promotional price available for a temporary time, a discounted price to reflect use of a discount coupon provided by the provider of the WS and/or the WSM, etc. In addition to use prices, various price-related use conditions may similarly be specified by service providers for WS usage models in at least some embodiments, such as to indicate to obtain one or more payments for a usage model in a specified currency and/or using a specified type of payment mechanism (e.g., a credit card charge, a bank account debit, a specified amount of pre-paid points or other pre-paid payment, etc.), to include one or more taxes (e.g., relative to a location of a user who is subscribing to and/or using the WS), to obtain multiple payments over time in a specified manner (e.g., to reflect a specified billing cycle or payment plan), to aggregate multiple payments from a consumer in a specified manner before the consumer is charged the aggregated amount, etc. More generally, payment for use of a WS, other service or other functionality may in at least some embodiments be made in any fashion that is accepted by a provider of the service/functionality and/or by another party facilitating the interaction (e.g., the WSM). Payment mechanisms may include money, credit or debit charges, charges to another account or service of a user (e.g., bill to a cellphone or landline phone account, to a cable provider account, etc.), pre-paid points (e.g., from a pre-paid card, such as a renewable stored value card), incentive or reward program points (e.g., frequent flier miles), etc. In some embodiments each WS provider can specify one or more usage models for each WS that they register, and the WSM then sets one or more consumer access prices that are each based on one or more use prices of the specified usage models for the WS (e.g., access prices that are each the same as one of the use prices, or instead that include additional fees charged by the WSM or a reduction in fees provided by the WSM).

In addition, as previously noted, a consumer (e.g., an application, a service, a Web site, etc.) and/or an end-user interacting with such a consumer may in some embodiments and situations pre-pay for the use of one or more WSes or other services being provided (whether by making payments that are specific to those one or more services, or instead purchasing pre-paid points available for use with multiple such services). Such prepayment may be initiated or triggered in various ways, such as in conjunction with one or more selected usage models for those one or more WSes or other services. For example, pre-payment may be triggered by a usage model that specifies a one-time pre-payment or an ongoing pre-payment (e.g., a monthly subscription fee that is charged at the beginning of each month of corresponding use), or instead a particular pre-payment may be initiated by the consumer or end-user. Furthermore, a consumer and/or end-user may in some embodiments further approve or otherwise specify that at least some payments be provided multiple times (e.g., periodically, such as each month, or based on actual usage, such as to obtain pre-payment for additional use when previous pre-paid use has been fully utilized or is sufficiently close to being fully utilized), such as in conjunction with one or more such subscriptions, and optionally to specify that a payment be applied to one or more services in a configured amount, ratio or other manner. The obtaining of such pre-payments may also occur in various ways in various embodiments and situations, including in a fully automatic manner or instead based on confirmation by the consumer and/or end-user (whether explicit confirmation or by failure to select an optional denial of such confirmation). As one example, a consumer and/or end-user may reserve a particular type of use (e.g., an amount of time) for one or more services, such as at a particular time or during a range of possible times, and pre-payment for the reserved use may be automatically obtained prior to or simultaneously with the actual use.

Various non-price-related restrictions and other use conditions may similarly be specified by service providers for WS usage models in at least some embodiments. For example, such use conditions may include restrictions on types of consumers allowed to use a WS, restrictions on types of uses allowed for a WS and/or for any information provided by its use, restrictions on how frequently a WS can be used by a particular consumer or by all consumers, restrictions on the number of authorized users for each subscription or other type of multi-use access, indications of information to be provided to and/or obtained from a consumer (e.g., terms of service to be displayed or otherwise provided to the consumer, and an indication of acceptance by the consumer of the terms), restrictions on a length of time or specific times at which the usage model is available or valid, restrictions on devices that can be used to access a WS (e.g., restrictions on numbers and/or types of access devices, such as to charge more for devices that have multiple CPUs), etc. In some embodiments, a WS provider may also configure that multiple WSes be made available together as a bundled group (e.g., multiple WSes from the WS provider that are available as a bundle for a limited time or according to specified criteria). For example, a WS provider may indicate that a usage model from each WS be used together, or instead create a single new usage model that corresponds to the multiple WSes. In other embodiments, the WSM may in some situations bundle together multiple WSes (e.g., WSes from multiple unrelated providers). In addition, while multiple usage models that are specified for a single WS will all be distinct in at least some aspects, in at least some embodiments the provider of the single WS may specify a subset of usage model information that is shared across some of the multiple usage models for a single WS (or across multiple usage models for multiple WSes from the provider), such as one or more shared use conditions and/or one or more shared use prices. Similarly, in some embodiments at least some use conditions may be specified for all usage models for a WS, such as restrictions on locations of users of the WS (e.g., to prevent use from specified countries or states, such as to reflect legal restrictions), restrictions on total volume and/or use of a WS (e.g., a maximum number of invocations per indicated time period for each consumer and/or for all consumers), etc.

In some embodiments, WS providers may also specify private usage models for WSes that are each available for selection only to a subset of consumers. Moreover, the existence of such private usage models may in some such embodiments be identified only to the subset of consumers for each of the private usage models and to the WS provider who configures the private usage model, such as in accordance with corresponding specification of access information for the private usage model by the WS provider. The consumers to whom a private usage model for a WS is available may be determined in various manners based on the configuration of the private usage model by the provider of the WS. Such consumers may include those that have some related pre-existing business relationship with the WS provider (e.g., having accepted a specified contract and/or agreed to specified terms and conditions), consumers that belong to an indicated organization or group or have another indicated affiliation, consumers of other WSes of the provider, new users of the provider's WSes, consumers that satisfy one or more other criteria indicated by the WS provider (e.g., consumers that have an indicated assessed level of trustworthiness or other reputational aspect), etc. Such private usage models may further support various types of functionality of interest. For instance, consumer interest in a usage model may be tested for a WS relative to one or more other usage models of the WS by making the usage model available to only a subset of consumers (e.g., half) and using the other consumers and other usage models as a control group. As another example, a new WS may be tested by making it available to only certain test users (e.g., beta test users), such as for a limited time.

After a potential WS consumer has identified a registered WS of interest, the potential WS consumer can interact with the WSM to obtain access to that WS, such as by providing one or more access fee payments based on one or more access prices (if any) for a selected usage model of the WS and by satisfying any other specified use conditions for the selected usage model of the WS. Moreover, in some embodiments the access fee payment(s) may be obtained from the consumer by the WSM in a manner to reflect specified conditions of the selected usage model, as discussed in greater detail elsewhere, such as to aggregate multiple payments from the consumer in a specified manner, to obtain the payment(s) in a specified currency and/or using a specified type of payment mechanism, to include one or more taxes, to obtain multiple payments over time in a specified manner, etc. In addition, in some embodiments a WS consumer may need to first register with the WSM as a user before obtaining access to registered WSes (e.g., to provide contact information, payment source information, formatting and protocol preferences for WS invocation response information, etc.).

When a consumer's access to a WS is authorized by the WSM but not provided immediately (e.g., by purchasing a subscription, such as based on a selected usage model), the consumer will in some embodiments receive authorization information for use with later requests for the authorized access (e.g., a unique subscription ID for a purchased subscription, or a transaction ID for later-occurring non-subscription transactions). If so, the later requests from the consumer to provide the authorized access may include providing at least some of the previously received authorization information, and may further be supplied or specified in a manner indicated to the consumer at the time of original access authorization. As previously noted, in some embodiments some or all consumers obtain access to registered WSes by purchasing multi-use subscriptions to those WSes in accordance with corresponding selected usage models of those WSes. In other embodiments, one-time subscription or limited non-subscription uses of a WS may be provided by selected usage models for a variety of reasons, such as to allow an evaluation or test use of a WS in order to determine whether to purchase additional uses, for use of registered WSes that are free, to allow anonymous access without a defined subscription, etc. In addition, in some embodiments ongoing subscriptions may be purchased that have associated ongoing payments over time. Different prices and other use conditions may be associated with various distinct types of subscriptions (e.g., non-commercial use subscriptions, educational subscriptions, governmental subscriptions, commercial use subscriptions, subscriptions for organizations or other groups of multiple related users that may restrict a number of concurrent or total users that may use the subscription, etc.).

After receiving an access request from a consumer for current use of a registered WS, the WSM determines whether the use of the WS by the consumer is authorized, such as based on any authorization information supplied with the request. In addition, in some embodiments the WSM may further determine at the time of requested WS use whether any payment obligations and specified use conditions are currently satisfied for an invocation of the WS. If the WSM determines that the WS use is authorized, the WSM facilitates consumer access to the requested WS by the consumer, such as by in some embodiments interacting with the provider of the WS to invoke the WS on behalf of the consumer, obtain any response information, and then provide some or all of the response information to the consumer. Alternatively, the WSM may in some embodiments facilitate a consumer's access to a WS by providing information to the consumer to allow the consumer to invoke the WS from the provider of the WS, such as in accordance with a particular usage model of the WS or other configuration specified by the provider related to how access to the WS will occur.

In some embodiments, the WSM performs additional formatting of the response information before providing it to the consumer. The information formatting can be performed in various ways and for various purposes, such as to act as a translator/adapter that accommodates previously specified preferences of the WS consumer (e.g., information format and/or protocol preferences requested from the WS consumer when they previously registered with the WSM), to combine the response information with other information (e.g., response information from other invoked WSes), and to obfuscate information related to the invocation of the WS (e.g., the specific invocation request, information about the WS provider, information about the time of invocation of the WS, etc.).

In addition, in some embodiments the WSM may maintain one or more caches or other storage mechanisms to store response information from WS invocations, and if so may in some situations provide such stored response information to consumers rather than invoking the WSes to obtain additional response information (e.g., when the stored data was recently received and is of a type that is not time-sensitive and/or subject to rapid change). Such response information may in some embodiments include not only information provided by the WS as the product of the invocation, but also status or other response messages (e.g., for a WS that does not otherwise provide information in response to its invocation) or instead an indication that the WS does not provide any response. Such caching may provide benefits to both WS consumers (e.g., by providing response information even if a WS provider is not currently available, by providing response information more rapidly than if the WS was dynamically invoked, etc.) and to WS providers (e.g., by providing to WS consumers a service invocation volume higher than the WS provider can actually handle, by providing service to WS consumers even if the WS provider has temporarily throttled some or all requests to its WS, etc.). Consumers may in such embodiments be charged the full price specified in the selected usage model for the stored response information, a discounted price that is predetermined (e.g., based on factors such as the consumer's particular usage model or usage pattern), a full or discounted price that is dynamically determined by the WSM (e.g., based on current factors), or no charge at all.

As previously noted, potential WS consumers may identify WSes of interest in a variety of ways. In some embodiments, the WSM allows potential WS consumers to search the registered WSes in various ways, such as based on the type of service and/or type of data provided, on the use price and/or use conditions (e.g., based on usage models available to that consumer), on the WS provider, on the WS description, on the amount or type of documentation available regarding using the WS, etc. In addition, in some embodiments, the registered WSes may be categorized into groups of related WSes (e.g., in a hierarchical manner with one or more levels of sub-categories), and if so potential WS consumers may be able to browse within specified categories and sub-categories and/or may be able to limit their search to specified categories and sub-categories. Moreover, a variety of types of WS-related information may be provided to potential WS consumers, such as by providing lists or other indications of top-ranked and/or top-rated WSes, indications of recommended WSes (e.g., personalized to the current potential WS consumer based on information known about that consumer), etc.

In addition, after identifying one or more WSes of potential interest, a potential WS consumer may be able to review additional information about each WS, such as by receiving a Web page specific to a WS that includes description information for the WS and that optionally includes various other information about the WS (e.g., pricing information, such as based on usage model(s) available to the consumer, information about the WS provider, etc.). In some embodiments, such WS-specific information may also include a variety of other types of information, including reviews of the WS by other WS consumers that have used the WS and/or summaries of such reviews, indications of rankings and/or ratings of the WS relative to other WSes based on various criteria (e.g., number of uses, a recent trend in use, consumer-specified ratings, etc.), indications of similar WSes (e.g., based on category) and/or otherwise related WSes (e.g., other WSes by the same WS provider, other WSes that have been used by other WS consumers that have previously used this WS, WS bundles that include this WS, etc.).

In some embodiments, some or all of the described actions by WS providers and/or WS consumers are performed via user interactions with a Web site for the WSM, such as a Web site dedicated to providing a marketplace for Web services or instead a Web site of a more general Web store that provides various types of items (e.g., products, services and/or information) that include the Web services and that are available for purchase, rent, lease, license, trade, evaluation, sampling, subscription to, etc. Alternatively, some or all interactions by the WS providers and/or WS consumers are instead performed by programs acting on behalf of the WS providers or consumers by programmatically interacting with one or more computing systems of the WSM, such as via defined APIs (e.g., via Web services provided by the WSM to implement the underlying functionalities for the WSM). In some embodiments, such APIs are based on the use of XML over HTTP (e.g., as part of the REpresentational State Transfer, or "REST", distributed interaction model that focuses on resources), while in other embodiments the APIs may be based on the use of SOAP and/or other protocols related to Web services.

In some embodiments, the WSM further provides a capability for at least some of the WS providers and/or WS consumers to monitor and manage their interactions with the WSM, such as via a portal. For example, a registered WS provider may in some embodiments monitor their registered WSes, such as to determine the current level and/or a historical level of the use of those WSes by WS consumers, to determine a current status of their WSes (e.g., to verify that their WSes are currently operating properly), to determine information about usage models for one or more of their WSes (including usage models no longer available to consumers, whether use based on those usage models still continues or not), etc. In addition, WS providers may be able to manage various aspects of their registered WSes, such as to modify pricing information and other use condition information for usage models or that are otherwise specified for the WSes, or to dynamically specify current throttling conditions for the use of their WSes (e.g., to limit volume and/or type of use of the WSes for a specified period of time or until specified conditions are satisfied or until further notice). WS providers may also review and/or manage their user account information, such as to change their current contact information or to review payment amounts currently owed to the WS provider by the WSM. In a similar manner, registered WS consumers may monitor and manage their WS subscriptions or other WS access authorizations (e.g., to review recent use of their subscriptions and the amount of previously purchased or otherwise approved subscription use remaining, to add authorized users for a subscription to a WS, to dynamically specify current throttling or other restriction conditions for the use of their subscriptions, etc.), as well as review and manage their user account (e.g., to modify payment source information, or to authorize additional WS subscriptions or other WS use, such as by purchasing WSM-provided "points" or otherwise prepaying a specified amount that can later be used to pay for or authorize WS use).

As one example of another type of information that can be specified by WS providers and/or WS consumers in some embodiments (e.g., via the WSM portal or during registration), various types of notification requests may be specified for various types of information. For example, a WS provider may want to receive a standard email notification when the average volume of invocations of their WSes over a specified period of time exceeds a specified threshold, and may further wish to receive an urgent alert notification when one of their WSes goes offline or otherwise generates an error condition. Similarly, WS consumers may wish to receive notifications based on use or current status of their subscriptions, on the current availability of specified WSes and/or specified categories of WSes, on the current status of their user account information (e.g., the amount of WSM points remaining; an amount of other prepaid usage available, such as in a manner analogous to a prepaid phone card; an amount of currency available in their account; when they are approaching the limit of their use within a time-based or usage amount-based subscription, when they are approaching a new tier in a tiered pay-per-use usage model), etc. Such notification requests may include specifications of how to perform the notification, as well as the conditions that trigger the notification when they are satisfied. As the WSM operates, it monitors defined notification conditions in order to determine when notifications are appropriate, and performs the requested notifications in the manner specified.

In addition, while a WS subscription is in some embodiments limited to the particular WS consumer that created the subscription, in other embodiments a WS subscription may be shared among multiple different users. For example, in some embodiments a WS consumer may specify one or more affiliate users for one or more of their WS subscriptions, with each affiliate user given specified rights to use those WS subscriptions (e.g., authorization to make a specified total number of WS invocation requests based on the subscription or a specified limit on the volume of such WS invocation requests, a specification of conditions under which use of the subscription by an affiliate is allowed or disallowed, etc.). In addition, in some situations a WS consumer may create a WS subscription on behalf of an indicated application (or a specified copy or instance of such an application), such as an application developed and/or distributed by the WS consumer, and may specify that some or all users of that application are authorized to use that WS subscription in some or all situations. Conversely, in some embodiments such an application developer or distributor may instead incorporate one or more WS invocation requests as part of their application (whether or not in conjunction with a subscription by that WS consumer), but may instead limit some or all uses of those WS invocation requests by the application users such that those users may instead need to provide their own payment and/or subscriptions to those WSes in order to use that functionality of the application.

In some embodiments, composite Web services may also be registered with the WSM and used by WS consumers, with each composite WS able to invoke one or more other WSes. In addition, in some embodiments a composite WS may include specified logic related to how and when to invoke the other WSes (e.g., based on a scripting language), such as to provide conditional invocation of one WS based on the response information received from another WS. As one example, a composite WS may invoke two or more other WSes (e.g., WSes from WS providers unrelated to the creator of the composite WS) in order to obtain response information that is then aggregated to provide the response information for the composite WS. As another example, some or all of the WSes specified for the composite WS are provided by the composite WS creator and the composite WS specifies logic such that one of the specified WSes is invoked only if appropriate information is received from earlier invocation of another of the WSes (e.g., if that received information is to be used as part of that later invocation). In yet another example, a composite WS may invoke a single WS (e.g., from a WS provider other than the composite WS creator) in order to encapsulate that single WS using additional information, and/or logic specified as part of the composite WS. In some embodiments, any third party can create and register composite WSes that invoke other WSes provided by other WS providers, while in other embodiments various restrictions may be imposed on the creation of such composite WSes (e.g., to limit composite WS creation to WS providers that provide at least one or all of the WSes that are part of the composite WS), such as restrictions configured by the provider of a WS when registering the WS. In addition, in some embodiments such composite WSes may have their own specified pricing information and other use conditions, such as part of configured usage models for the composite WSes by their creators, while in other embodiments such pricing and use conditions may instead be automatically determined based on the pricing and use conditions of the underlying WSes invoked by the composite WS.

Similarly, in some embodiments bundled WSes may also be registered with the WSM and used by WS consumers, with each bundle containing one or more WSes. Such a bundle of WSes may, for example, provide separate access to each of multiple WSes in the bundle at a cost that is less than that of individually accessing each of those WSes, or instead may provide access to one or more WSes as part of a bundle that are not otherwise available. In some embodiments, each such WS bundle may have its own one or more specified usage models that are distinct from the usage models of any of the WSes in the bundle. In some embodiments, restrictions also may exist on who may bundle a WS from a WS provider (e.g., only the WS provider), while in other embodiments the WSM and/or some or all other users may be allowed to bundle the WS (e.g., to bundle the WS with WSes from one or more other WS providers). Such bundling restrictions for a WS may in at least some embodiments be configured by the provider of the WS, such as to be included in some or all usage models for the WS.

Moreover, in some embodiments various third parties can interact with the WSM to obtain various additional functionality for themselves and/or to provide such additional functionality to other users. For example, in some embodiments external computing systems may provide WS coordination services to other users, with the computing systems defining WS coordination requests and interacting with the WSM to request satisfaction of those requests. Such coordination requests may in some embodiments specify other registered WSes to be invoked and/or specify various logic to be executed, thus providing capabilities similar to those of registered composite WSes without having to register those WS coordinations. The coordination requests may be supplied to the WSM for execution (e.g., for a fee charged by the WSM, or instead based on specified pricing information for usage model(s) for the WSes invoked by the coordination), and may be represented in various ways in various embodiments (e.g., as data structures, code modules, templates, mappings, portable code, etc.). In other embodiments, such third-party coordination services may instead execute the coordination logic for coordinations, such as by interacting with the WSM to individually invoke each WS for the coordination as specified by the logic for the coordination and then combining any resulting response information to be provided to the requester of the coordination (e.g., a user of the coordination service, such as for a fee).

In addition to coordination services, third parties can obtain and provide a variety of other types of functionality by interacting with the WSM. For example, in some embodiments some third parties may provide WSM agents that interact with the WSM to provide additional functionality to users, such as to monitor various aspects of the operation of the WSM in order to provide information or notifications to the user (e.g., in situations in which the WSM does not provide corresponding notification capabilities for the type of information being monitored by the agent, or instead to replicate a capability available from the WSM for a user who is not eligible to receive the information from the WSM). A variety of other types of interactions with the WSM can similarly be provided to enable various other types of additional functionality and capabilities.

As previously noted, in some embodiments some or all of the registered WSes may have specified pricing information (e.g., based on use prices of usage models) such that WS consumers provide payment to use those WSes. In some embodiments, a variety of types of billing mechanisms are provided for WS consumers. For example, as previously noted, in some embodiments WS consumers may be able to purchase WS subscriptions that can then be used at later times, and in some embodiments the WSM may sell non-subscription WS access. In some embodiments, the billing mechanisms for a WS may also include one or more use prices specified in a usage model for the WS that are to be charged multiple times (e.g., periodically), such as in a manner configured by the provider of the WS (e.g., to indicate timing for the multiple charges, such as a payment cycle). In addition, in some embodiments the WSM may accumulate the costs of some or all of the WS uses for a consumer over a specified period of time (e.g., all of the uses of a particular WS, or some or all uses of multiple unrelated WSes), such as to provide a single monthly or other periodic bill for those uses. In addition, in some embodiments billing occurrences are based on prior specified Service Level Agreements ("SLAs") with certain WS consumers and/or based on the Quality of Service ("QoS") requested by and/or actually provided to the consumer. A WS provider may, for example, throttle use of a WS in accordance with one usage model for the WS to ensure that a high QoS for that and/or another usage model for the WS is satisfied, as well as to potentially encourage high volume users to select an appropriate usage model that has a sufficiently high volume and QoS. For example, a provider of a WS may specify a use price and usage model for that WS that is based on one or more specified QoS levels provided by that WS provider in conjunction with the access to that WS (e.g., a maximum response time, a minimum level of accuracy of response information, etc.). The specified use price and usage model for that WS may be the only use price and/or usage model for that WS, or instead may be one of multiple use prices and usage models (e.g., with one or more of the other use prices and usage models having other specified QoS levels and/or no QoS levels). If there are multiple use prices and usage models for the WS, access to the WS that is purchased based on a particular use price and/or usage model (e.g., a subscription purchased for an access fee based on that use price and/or usage model) is performed in accordance with the specified QoS levels for that particular use price and usage model when possible. Similarly, an operator of the WSM may in some embodiments specify an access price for each of one or more of the registered WSes that is based on one or more specified QoS levels provided by the WSM in conjunction with access to those WSes (e.g., a maximum response time, a minimum level of accuracy of response information, etc.). For example, the access price may be the only access price for a WS, or instead may be one of multiple access prices for the WS (e.g., based on one or more specified use prices and/or usage models for the WS, with one or more of the other access prices having other specified QoS levels provided by the WSM and/or no QoS levels). If so, access to the WS that is purchased based on a particular access price is performed in accordance with the specified QoS levels for that access price when possible. In some embodiments, if access to a WS is not provided to a consumer in accordance with specified QoS levels purchased by that consumer and/or is not provided in accordance with any previously specified SLAs for that consumer, various additional actions may be taken to compensate the consumer (e.g., by providing a payment credit, by not counting that access as part of the paid access for the consumer, etc.) and/or to correct any problems (e.g., to correct any internal mechanisms of the electronic marketplace, such as by notifying appropriate personnel associated with the electronic marketplace; to correct performance of the provider of the WS, such as by notifying appropriate personnel associated with the WS provider and/or by providing a financial incentive to the WS provider, such as by delaying or reducing payment to that WS provider; etc.).

Moreover, in some embodiments WS consumers can obtain WSM-provided points that can be later used to purchase subscriptions and other WS access for various WSes— such points may be a WS payment option that WS consumers can purchase or otherwise earn (e.g., as a reward) for later use with a specified group of WSes and/or WS providers (e.g., all or a subset of WSes and WS providers). The points for a WS may be identified to a potential WS consumer in various ways in various embodiments (e.g., displayed or otherwise accessible as a subscription or access price for some or all WSes, whether in addition to or instead of one or more prices in governmental currencies). The determination of how many points are needed to purchase access to a WS subscription or other WS access may similarly be determined in various ways in various embodiments (e.g., by specifying and using a standard exchange rate for all WSes; by allowing each WS and/or WS provider to have an individualized specified exchange rate, such as one specified at registration time for the WS and/or WS provider (e.g., as part of one or more usage models for the WS); or by dynamically determining appropriate WSM points for a WS based on a variety of factors when the price is provided to a potential WS consumer, such as a current usage rate of the WS, other current conditions such as a current day/time, information about the WS consumer, etc.). In some embodiments, other related types of prepaid access to one or more WSes may be purchased by consumers and used in similar manners, such as to purchase a specified amount of time for a particular WS or for access to any of some or all of the WSes (e.g., WSes of a particular category or type) in a manner similar to that of a prepaid telephone card. Similarly, in other embodiments the WSM may aggregate or otherwise accumulate the costs of some or all of the WS uses for a consumer over a specified period of time, such as to provide a single monthly bill for all use of a specified WS or of all WSes.

In addition, in some embodiments the WSM provides various security and/or privacy mechanisms to ensure that only authorized WS providers can register and provide WSes and/or that only authorized WS consumers can subscribe to and/or access registered WSes. Such security and/or privacy can be provided in a variety of ways, including the use of passwords, public key encryption, digital certificates, etc. In addition, the WSM may use various security and/or privacy mechanisms with respect to management/monitoring interactions by WS consumers and/or WS providers, such as to provide information to users only when they are authorized to receive it and to allow modification of WS-related information and of subscriptions only when authorized. Similarly, in embodiments in which affiliates of WS consumers or other users are allowed at least some access to subscriptions of the WS consumer, various security and/or privacy mechanisms may be employed to ensure that the affiliates are authorized to receive any benefits and information provided to them.

Furthermore, in addition to having WSes provided by third-party WS providers and to providing access to registered WSes for third-party WS consumers, in some embodiments the WSM itself may act as a WS provider and/or WS consumer for one or more WSes, such as an alternative to other third-party provided WSes or instead to provide WSes that are not otherwise available to WS consumers. In addition, various other capabilities provided and used by the WSM may also be implemented as WSes, such as a WSM API available to WS providers and/or WS consumers, as well as internal capabilities used by the WSM (e.g., determining whether a specific subscription request for a WS satisfies the specified use conditions for that WS by invoking an internal WS that provides the service of comparing the specified use conditions and requested use information to determine whether the specified use conditions are satisfied).

Furthermore, as previously noted, in some embodiments the use of the WSM and/or individual WSes may be restricted with respect to selected geographic locations (e.g. global regions, countries, states, etc.). Such geographical limitations may be enforced in various ways, including the use of Geo-IP blocking, accepting payments only from accepted geographical locations, and/or terms of service of the WSM such that users certify that they are located (or not located) within an indicated geographical location. In other embodiments, the WSM may act differently based on the location of a consumer, such as by offering only a subset of the registered WSes to the consumer, offering different usage models and/or different use prices or different use conditions to the consumer, charging different taxes and fees (e.g., VAT in European countries, or sales tax where appropriate) to the consumer, etc. The WSM may similarly act differently based on the location of the provider, including varying fees and/or taxes that may be levied upon providers for certain geographical locations (e.g., taxes required by local laws), such as by withholding appropriate amounts from payments made to the provider.

Various other types of capabilities may similarly be provided in at least some embodiments. For example, while creation of one or more usage models for a WS may occur as part of the registration of the WS, in at least some embodiments usage models may be modified and created by WS providers at other times, such as when the WS providers are managing their WSes. As previously noted, such managing of WSes may be performed, for example, via a portal provided by the WSM, and may include managing WSes and/or usage models that are no longer available to consumers (e.g., including usage models that are no longer available for selection but that are still in use by some consumers based on prior selections). By enabling WS providers to configure usage models for their WSes, similar WSes from different WS providers will compete in the marketplace for selection by consumers, providing better selection for consumers. Furthermore, allowing billing to be performed between applications (e.g., from applications of consumers, such as applications used by the consumers or provided by application developer or distributor consumers to other end-users, to applications of WS providers that provide the WSes) enables various functionalities to be provided to users of applications. As one example, when a user is interacting with a first service (e.g., a service provided by an application program or a Web site), that first service may perform billing (or otherwise obtain payment) from or for the user on behalf of the user's use of the first service and/or on behalf of the user's use of one or more other services or functionality (e.g., third-party services that are unrelated to the first service doing the billing). Moreover, the first service doing the billing may further configure pricing for the use of the other services or functionality via the first service that is different from that otherwise charged by the other services or functionality. For example, the first service may charge more than is charged by the other services or functionality (e.g., in order to retain the difference, such as to reflect discounted prices of the other services or functionality that are available to the first service, or to add to the same price that the other services or functionality would charge the first service or the user directly). As yet another example, the first service may charge less than is charged by the other services or functionality (e.g., as part of functionality provided to the user, as a benefit provided to some or all users, to reflect discounted prices of the other services or functionality that are available to the first service, etc.). In addition, as previously noted, in some embodiments a WS provider may request that one or more discount coupons be generated for a WS and/or for use with an indicated usage model (e.g., at the time of WS registration or other usage model creation), such as for distribution to potential consumers by the WS provider or by the WSM under indicated conditions. Moreover, as discussed in greater detail elsewhere, the WSM may track and monitor use of WSes by consumers in various ways and for various purposes, including to track when WSM points and/or prepaid access of a consumer to one or more WSes is exhausted, such as to notify the consumer and/or to cutoff any further access to those WSes until additional payment is received. In some embodiments, the WSes and/or other services made available via the WSM may further include one or more WSes or other services that are provided by the WSM, such as services made available to consumers in a manner similar to services provided by third-party service providers and/or services made available to WS providers to facilitate their use of the WSM. In addition, in some embodiments usage models may be used to control access of consumers to WSes without obtaining payment from the consumers, such as to identify and authenticate consumers who use the WSes, and optionally with payment and/or other interactions between the consumers and the providers of the WSes occurring outside the operation of the WSM.

In addition, as discussed in greater detail below, the WSM can also provide a variety of other types of functionalities and capabilities as described.

For illustrative purposes, some embodiments of the software facility are described below in which a specific WSM embodiment provides various specific types of capabilities and functionalities with respect to various specific types of WSes, and uses various specific types of user interfaces and other interactions to provide those functionalities and capabilities. However, those skilled in the art will appreciate that the techniques of the invention can be used in a wide variety of other situations, including with services and items other than Web services, and that the invention is not limited to the exemplary details provided.

FIGS. 1A-1D illustrate examples of a user interface provided by an embodiment of the WSM to assist WS provider users and WS consumer users in interacting with the WSM. In particular, FIG. 1A illustrates a user interface screen that provides information 110 about various registered WSes available via the WSM, which in this example are displayed to a potential WS consumer as search results in response to a search by the WS consumer for Web services related to the search term "map." In other embodiments, information about available WSes can be provided to WS consumers in a variety of other ways, and a level of detail or other amount of information that is provided to a consumer may be configured by the provider of a WS. In addition, in this example embodiment the WSM is part of a Web store that provides to consumers a variety of types of items that include registered WSes.

In this example embodiment, various information about a number of available WSes 110a-110j is displayed to the potential customer, with the WSes divided into several WS categories 111 as shown. A variety of information is provided for each indicated WS, including a name 112, an indication of the WS provider 113 that is the source for the WS, one or more prices 114 corresponding to use of the WS (such as in accordance with one or more usage models of the WS), any specified use conditions 115 for the WS (such as in accordance with at least one usage model of the WS or all usage models of the WS), and a description 117 of the WS. In this example, those types of information are provided by a WS provider when registering a WS. Each WS further has a unique item ID 116 that is automatically generated by the WSM, although in other embodiments such unique item IDs may not be used or the item ID may be different for each usage model of a WS. In some embodiments, the provider of a WS may specify which use conditions will be displayed or otherwise provided to a user when searching, while in other embodiments the WSM may automatically determine which use conditions or other information to provide or instead all use conditions may be provided. As is shown, a variety of types of pricing models and use conditions are illustrated in this example.

FIG. 1B illustrates an example user interface screen via which a potential WS consumer can review information about an available WS and select to subscribe to the WS, such as by selecting a corresponding usage model for the WS. In particular, the illustrated user interface includes a section 121 that provides a summary description of a particular WS and a section 127 that provides additional details about the WS. The user interface screen also includes a user-selectable control 123 via which the user can indicate to save an indication of the WS in a shopping cart of the user for possible later subscription. In addition, the user interface screen includes a section 125 via which the user can select to request a subscription to the WS, such as in accordance with a selected usage model, including a user-selectable control 125a to make the subscription request using the current information in user-modifiable fields 125b and 125c. In particular, field 125b may be provided for WSes that have multiple associated subscription types or other usage models, such as a single-use subscription and a monthly subscription, and the user-modifiable field 125c corresponds to situations in which the user has multiple predefined sources of payment that they can select for use. Thus, in this example, before selecting the control 125a, the user may select a type of subscription (e.g., with a corresponding subscription price, such as in accordance with a selected usage model) and a payment option to be used for the payment. Field 125b may in some embodiments show only the usage models available to this consumer, including any private usage models, while in other embodiments some or all unavailable usage models may also be shown (e.g., in a manner that does not allow selection by the consumer). After the user selects the control 125a, the WSM determines whether to approve the subscription request, and if so takes appropriate steps to implement the subscription. Moreover, determining whether to approve the subscription request may in some embodiments involve taking additional actions in accordance with a selected usage model, such as to display specified terms (e.g., as part of a contract) and optionally obtain agreement to them from the consumer. While not illustrated here, the WSM may further collect additional information from the potential WS consumer for use in approving at least some subscription requests, such as in a manner to reflect configuration of a selected usage model.

FIG. 1C illustrates an example user interface screen with which a WS provider can register a WS so as to make it available to consumers via the WSM. While not illustrated here, in some embodiments a WS provider who is registering a WS may also provide a variety of types of administrative and other information (e.g., name and contact information), such as when registering the WS or instead during a prior registration of the WS provider as a user of the WSM. In this example, the WS registration screen includes instructional information 131, and sections 133-137 in which the WS provider user can specify various types of information for the WS being registered, including a name, pricing information and use conditions (such as for one or more usage models), a description, and one or more optional related terms (e.g. to assist in automatic categorization of the WS and/or to assist in identification of the WS as relevant to a potential consumer's search or other expression of interest about WSes). In this illustrated example, the pricing information section 135 allows the WS provider to specify one or more use prices for different types of subscriptions or other uses of the WS, such as based on multiple predefined types of use prices and in accordance with one or more usage models being configured. However, in other embodiments only a single type of pricing may be allowed (such as for only a single usage model that is allowed). In addition, at least some of the registered WSes may not include some or all of the types of information. For example, pricing information may not be included (e.g., for free WSes), other types of use conditions may not be included, and/or usage models may not be included. The illustrated WS registration screen also includes a user-selectable control 139 via which the WS provider can indicate to register the WS after appropriate information has been supplied. After the control has been selected, the WSM determines whether to approve the registration, and if so takes appropriate action to notify the WS provider of the acceptance and to make the registered WS available to consumers via the WSM. In some embodiments, a WS provider may perform actions similar to those illustrated in FIG. 1C for each usage model being configured for a WS.

While not illustrated here, a variety of other types of information may similarly be specified as part of one or more registration screens by a WS provider for a WS being registered in other embodiments. For example, such information may include information concerning interacting with or accessing the WS (e.g., input parameters and a URL to invoke the service, such as may be defined in a provided WSDL file), restrictions that are specific to the WS rather than to any individual usage model of the WS (or that are shared across all usage models for the WS), indications of scheduling and/or testing information for the WS or for one or more usage models of the WS (e.g., to indicate a test of new pricing information or of a new usage model, to limit access during an indicated testing phase, etc.), a request that one or more discount coupons be generated for the WS or for a usage model (e.g., for distribution to potential consumers by the WS provider or by the WSM under indicated conditions), information regarding the timing of multiple charges that are to be made (e.g., when a single use price is to be charged multiple times, such as during an indicated billing cycle), information regarding how use prices are to be charged (e.g., allowed payment instrument types and/or allowed currencies), details regarding a multi-tiered usage model is structured (e.g., the parameters of each tier, such as based on usage volume, amount of time, etc.), details regarding different use prices and/or use conditions for different situations or criteria (e.g., higher prices for indicated peak usage time or conditions than for non-peak time or conditions), restrictions on the number of users allowed to share a multi-use subscription, instructions for aggregation of payments, etc. In addition, in some embodiments the WS provider may specify multiple pieces or types of descriptive information for a WS (e.g., both a short description and a detailed description of the WS to be displayed to consumers at different times and/or in different locations, such as for use in a consumer user interface screen similar to that shown in FIG. 1B), etc. In addition, the information being configured by a WS provider for a WS may be specified in a variety of ways, such as in an interactive or programmatic manner, and using various types of user interface widgets and other input mechanisms (e.g., a dropdown list to indicate predefined types of use prices or predefined types of use conditions).

FIG. 1D illustrates an example user interface screen via which various types of information about registered WSes can be provided to potential WS consumers. In particular the illustrated user interface screen includes a section 140 that provides various information about top-ranked WSes available via the WSM, such as to illustrate a current rank, a rating 141, indications of similar WSes 142, and indications of other WSes 143 that may be of interest based on preferences of other users. In this example, the WS ratings are user-specified and the ranks are automatically calculated in one of a variety of ways (e.g., cumulative sales volume, recent sales volume, recent trends in sales volume, accuracy or other performance measure for the WS, total usage based on the number of access requests or other usage measure, breadth of invocations based on the number of different WS consumers and/or applications making the access requests, number of access requests per second, etc.), although ratings and/or rankings could be determined in other ways in other embodiments. In some embodiments, ranking and/or rating information may be provided for particular usage models, such as to indicate relative popularity or value of different usage models for a particular WS, or to indicate the rankings of the most popular usage models.

The example user interface screen in FIG. 1D also includes a section 145 that provides various personalized recommendations of registered WSes to the current user, such as based on previously specified interests of the user and/or other automatic determinations of WSes of potential interest (e.g., based on usage history for the user). In this illustrated example, each of the recommended WSes 145a-145b is illustrated with various associated information, such as a corresponding use price and WS provider, and each additionally has an associated user-selectable control 146 with which the WS can be added to the user's shopping cart and a user-selectable control 147 with which the user can request to immediately subscribe to the WS. In some embodiments, when a WS has multiple usage models, the different usage models may be shown separately, or may instead be represented together (e.g., via a dropdown list or other list type from which the various usage models available to that consumer may be displayed and selected, including private usage models). This illustrated user interface screen further includes various information related to user reviews of one or more WSes (e.g., of a WS selected in another portion of the screen, or of a particular WS indicated to the user), including a user-selectable control 148 with which the user can select to provide their own review and/or rating of the WS (e.g., after use of the WS) and a section 149 that includes various review and rating information for the WS provided by one or more other users. While these various types of WS-related information are illustrated on a single screen in this example, in other embodiments some or all of the information could be provided at other times and in other manners (e.g., by providing review and rating information for a WS on a detail screen for that WS, such as the screen illustrated in FIG. 1B, or instead via a search screen similar to that illustrated in FIG. 1A).

In addition, in some embodiments the user interface may include one or more screens that allow the user to specify security and/or privacy information as desired. For example, a WS consumer may be able to prohibit or otherwise restrict access to WSes on their behalf (e.g., for all or a specified subset of their subscriptions) based on various user-configurable settings, including based on IP addresses associated with WSes, on developer tokens associated with users making WS access requests, on referring URLs, on subscriber ID, via cookies, etc. A WS provider may similarly be able to prohibit or otherwise restrict access to WSes that they provide in a variety of ways, including by specifying various use conditions or use restrictions as part of the usage model, and WS providers and WS consumers may in some embodiments be able to specify various security and/or privacy information for use in accessing information about their accounts and provided and/or accessed WSes.

Figure 2:
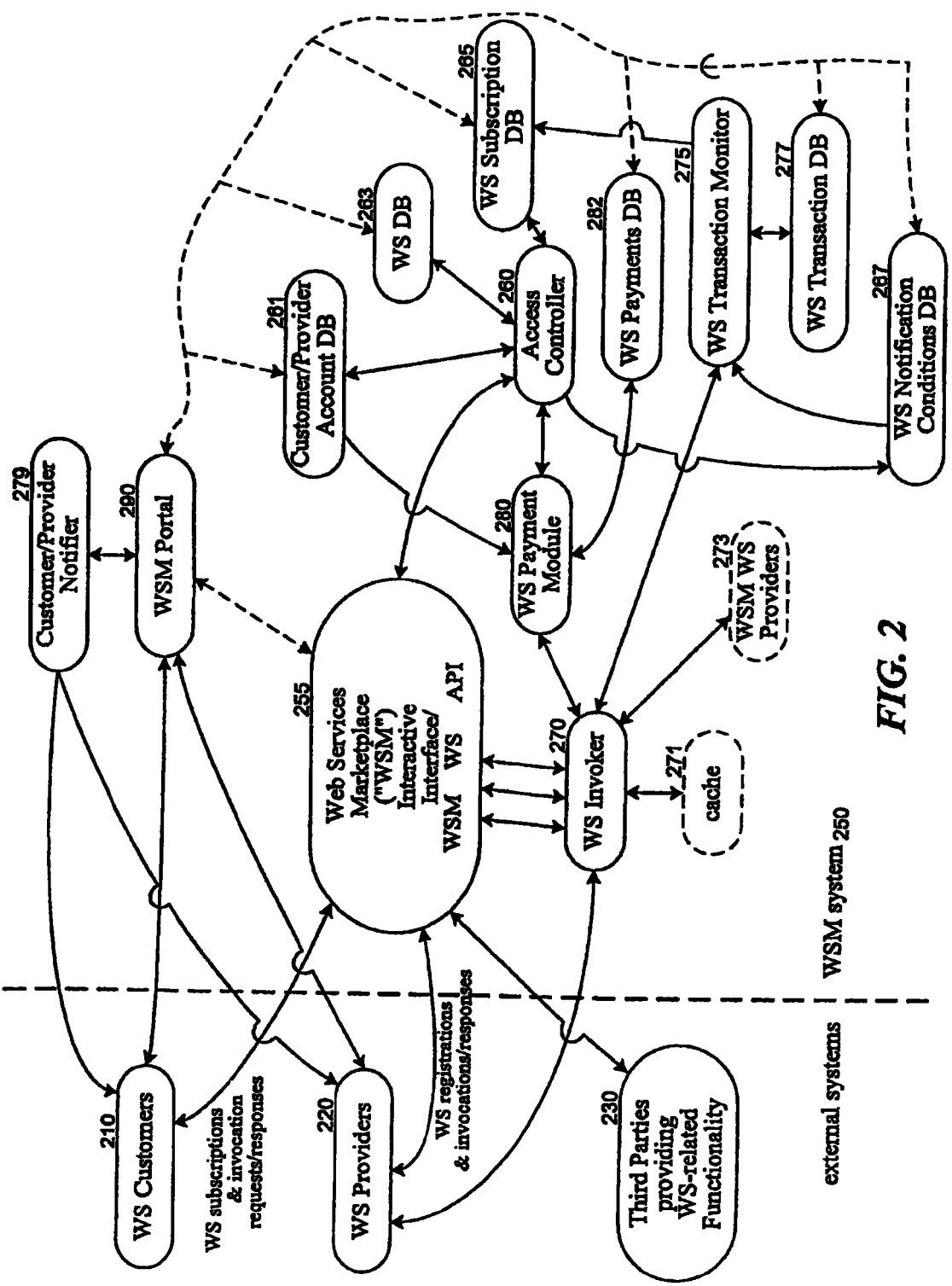
FIG. 2 is a network diagram illustrating components and information flow of an example embodiment of the WSM system.

FIG. 2 is a network diagram illustrating components and information flow of an example embodiment of the WSM system and of various external computing systems and users interacting with the WSM system. In particular, in the illustrated embodiment various WS consumers 210 and WS providers 220 external to the illustrated WSM system 250 interact with the WSM system to register, configure, identify, subscribe to, and obtain access to WSes. In addition, in this example embodiment various optional third parties 230 external to the WSM system may also interact with the system to receive or provide various enhanced or alternative capabilities and functionalities.

In particular, WS providers interact with a front-end interface 255 of the WSM system to register WSes, as well as in some embodiments to initially register themselves as users of the WSM system (e.g., as WS provider users). In the illustrated embodiment, the front-end interface 255 may be a Web site with which the user interacts and/or an API (e.g., a WS API) with which external computing systems and executing applications interact, although in other embodiments other types of front-end interfaces may alternatively be used.

In this illustrated embodiment, after the front end 255 receives a registration request for a WS provider or for a WS available from the provider, corresponding information is forwarded to an Access Controller component 260 of the WSM system to determine whether to approve the request (e.g., based on whether sufficient appropriate information was provided, and/or on whether other predefined criteria have been satisfied, such as whether use conditions and other criteria for a selected usage model are satisfied with respect to a consumer request for access to a WS), and indicates to the front end whether the request was approved. In addition, the Access Controller component stores information about the registered WS (such as the information configured for one or more usage models) or WS provider for later use in a WS database 263 or Consumer/Provider User Account database 261, respectively.

In a similar manner, WS consumers interact with the front end to obtain information about available WSes, to subscribe to or otherwise request access to available WSes, and in some embodiments to initially register with the WSM as a user (e.g., a WS consumer user) prior to such subscription/access requests. As with registration requests from WS providers, the front end forwards information regarding WS consumer registration, subscription, and access requests to the Access Controller for determination of whether to approve the requests, and the Access Controller responds to the front end in an appropriate manner. The Access Controller also stores information about registered consumers in the Account database 261 and about registered subscriptions to WSes and other WS access authorizations in the WS subscription database 265.

In other embodiments, some or all such information could instead be stored in other manners, such as to maintain separate account database information for WS consumers and WS providers, or to maintain subscription information and other usage model information along with other user information in the Account database. In addition, in embodiments in which WS providers and/or WS consumers can specify notification requests (e.g., at the time of user registration), such information is also forwarded to the Access Controller, which stores the information as appropriate in the WS Notification Conditions database 267 for later use.

In the illustrated embodiment, the WSM system further includes a WSM Portal component 290 with which WS consumers and WS providers can interact to obtain information about their accounts and to perform other interactions with the WSM system, such as to monitor and/or manage usage models and other WS-related information. In some embodiments, the WSM Portal interacts with the front-end interface to perform requested retrievals and modifications of information, while in other embodiments instead interacts directly with the various databases 261, 263, 265, 267, 277 and 282 as appropriate.

When a WS access request is received from a WS consumer and the Access Controller approves the request, the front end interacts with a WS Invoker component 270 to perform invocation of one or more WSes as appropriate, such as based on information retrieved from the WS database and/or received from the front end. WS Invoker component then interacts with one or more WS providers as appropriate to invoke the appropriate WSes and to receive response information, although in other embodiments the WS Invoker may instead only facilitate access by a consumer to a WS without directly performing the invocation. In some embodiments, the WS Invoker stores received response information in an optional cache 272 for later use, such as to use in lieu of a WS invocation in certain situations as appropriate. In addition, in some embodiments one or more of the WS providers from which the WS Invoker may invoke WSes can be one or more optional internal WSM WS providers 273. After obtaining the appropriate response information, whether from a WS provider or from the cache, the WS Invoker component returns the response information to the front end. In some embodiments, the front-end interface performs additional processing on the received response information before providing it to the requesting WS consumer, such as to aggregate information from multiple invoked WSes and/or to format the response information in accordance with previously specified preferences for the WS consumer.

In addition, in the illustrated embodiment the WS Invoker component also provides information to a WS Transaction Monitor component 275 regarding some or all processed WS invocation requests, such as for all requests whether satisfied from the cache or from a WS provider, or instead only for successful requests to an external WS provider. In the illustrated embodiment, the WS Transaction Monitor component in turn stores information about the transactions in a WS Transaction database 277 as appropriate, with the stored information then available for various uses (e.g., to charge the appropriate amount for consumer-selected usage models used in the transactions). In addition, in the illustrated embodiment the WS Transaction Monitor component reviews information in the WS Notification Conditions database to determine whether transactions and/or other status information have triggered one or more specified notification conditions, such as after each transaction or instead on a periodic basis. When the WS Transaction Monitor component determines that one or more notifications have been triggered, the component forwards corresponding information to a Customer/Provider Notifier component 279 to perform notifications to WS consumers and/or WS providers as appropriate.

When a received request by the Access Controller and/or WS Invoker corresponds to payment that needs to be obtained on behalf of a consumer regarding a WS (e.g., for a subscription request or other WS access request), one or more of the components interact with a WS Payment Module component 280 in the illustrated embodiment to provide information about the corresponding request or transaction, although in other embodiments the front end could instead interact directly with the Payment Module. The Payment Module then determines the appropriate payment that is needed (e.g., by receiving the information from another component and/or by retrieving appropriate information from one or more of the databases, such as the WS Subscription database, WS Transaction database and/or Account database), and performs the necessary functions to obtain the payment, such as in accordance with previously provided payment source information and any specified preferences provided by the WS consumer and with any payment-related use conditions configured by the provider of the WS. The Payment Module also stores information about the payments obtained from WS consumers and any corresponding payments owed and/or provided to WS providers in a WS Payments database 282.

As previously noted, in some embodiments one or more third-party systems or users 230 may additionally be present to interact with the WSM system, such as via the front-end interface. As discussed in greater detail elsewhere, such third-party systems may provide a variety of types of services and functionalities, including coordination, agent-based monitoring, payment processing, etc.

Figure 3:
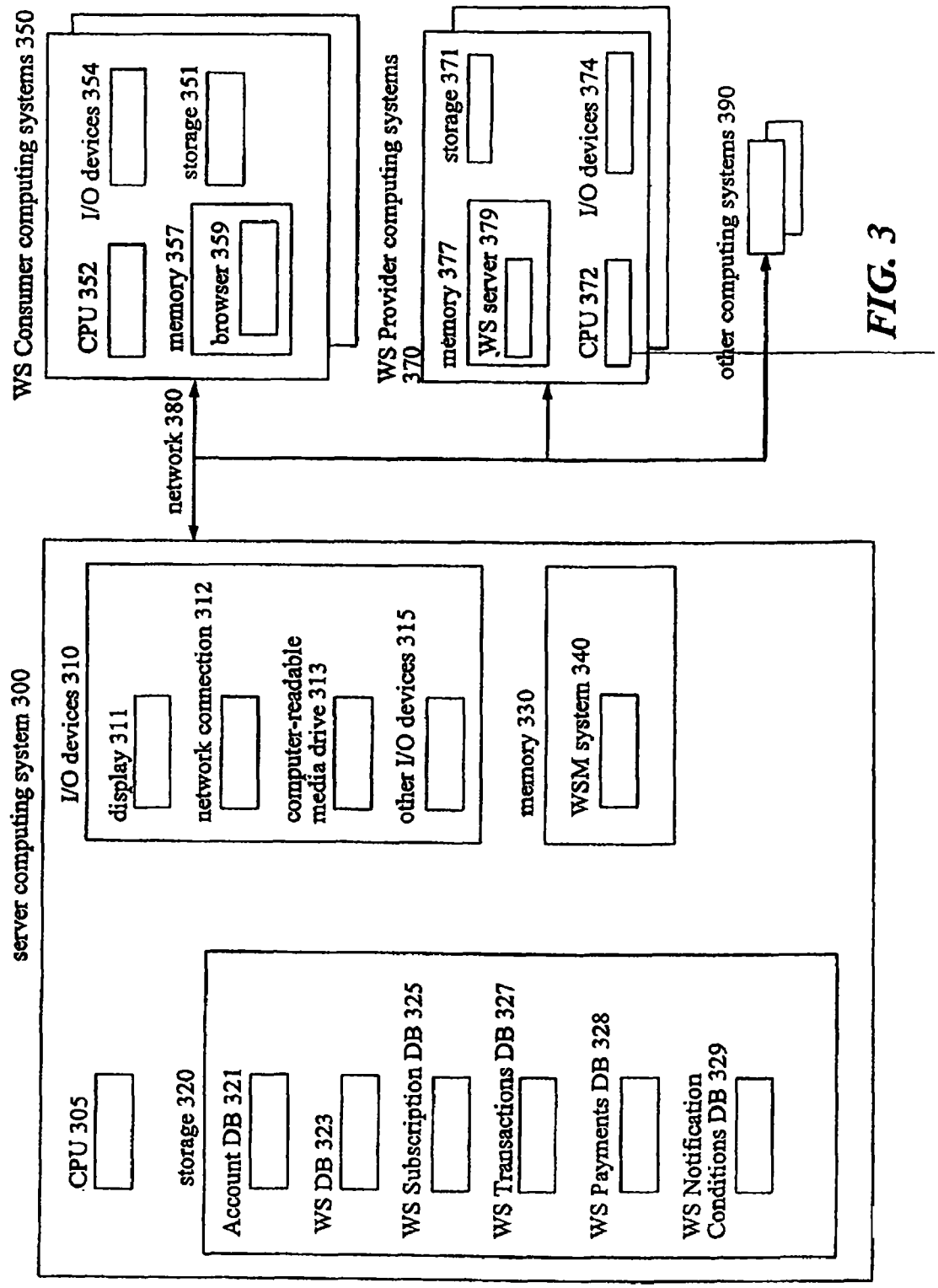
FIG. 3 is a block diagram illustrating an embodiment of a computing system suitable for executing an embodiment of the WSM system.

FIG. 3 illustrates a server computing system 300 suitable for executing an embodiment of the Web Services Marketplace ("WSM") system facility, as well as various WS consumer computing systems 350, WS provider computing systems 370, and other computing systems 390. In the illustrated embodiment, the server computing system includes a CPU 305, various I/O devices 310, storage 320, and memory 330. The I/O devices include a display 311, a network connection 312, a computer-readable media drive 313, and other I/O devices 315.

An embodiment of the WSM system 340 is executing in memory, and it interacts with the other computing systems over the network 380 using the network connection 312 (e.g., via the Internet and/or the World Wide Web). The other computing systems can similarly execute various information as part of the interactions, such as a Web browser 359 executing in memory 357 of the WS consumer computing systems to allow users of the systems to interact with the WSM system, and such as a WS server 379 executing in memory 377 of the WS provider computing systems to provide Web service functionality. Such other computing systems also include a variety of I/O devices in the illustrated embodiment, including network connections to communicate with each other and the server computing system over the network. In addition, in the illustrated embodiment a variety of datastores (e.g., databases) 321, 323, 325, 327, 328 and 329 are present on the storage 320 for use by the WSM system, although in other embodiments some or all such databases may instead be located elsewhere and/or be organized in other manners.

Those skilled in the art will appreciate that the illustrated computing systems are merely illustrative and are not intended to limit the scope of the present invention. Computing system 300 may be connected to other devices that are not illustrated, including through one or more networks such as the Internet or via the Web. More generally, the "server" and other computing systems may comprise any combination of hardware or software that can interact in the manners described, including computers, network devices, internet appliances, PDAs, wireless phones, pagers, electronic organizers, television-based systems and various other consumer products that include inter-communication capabilities. In addition, the functionality provided by the WSM system components illustrated in FIG. 2 may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the WSM system components or data structures may also be stored (e.g., as instructions or structured data) on a computer-readable medium, such as a hard disk, a memory, a network, or a portable article to be read by an appropriate drive. The WSM system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 4:
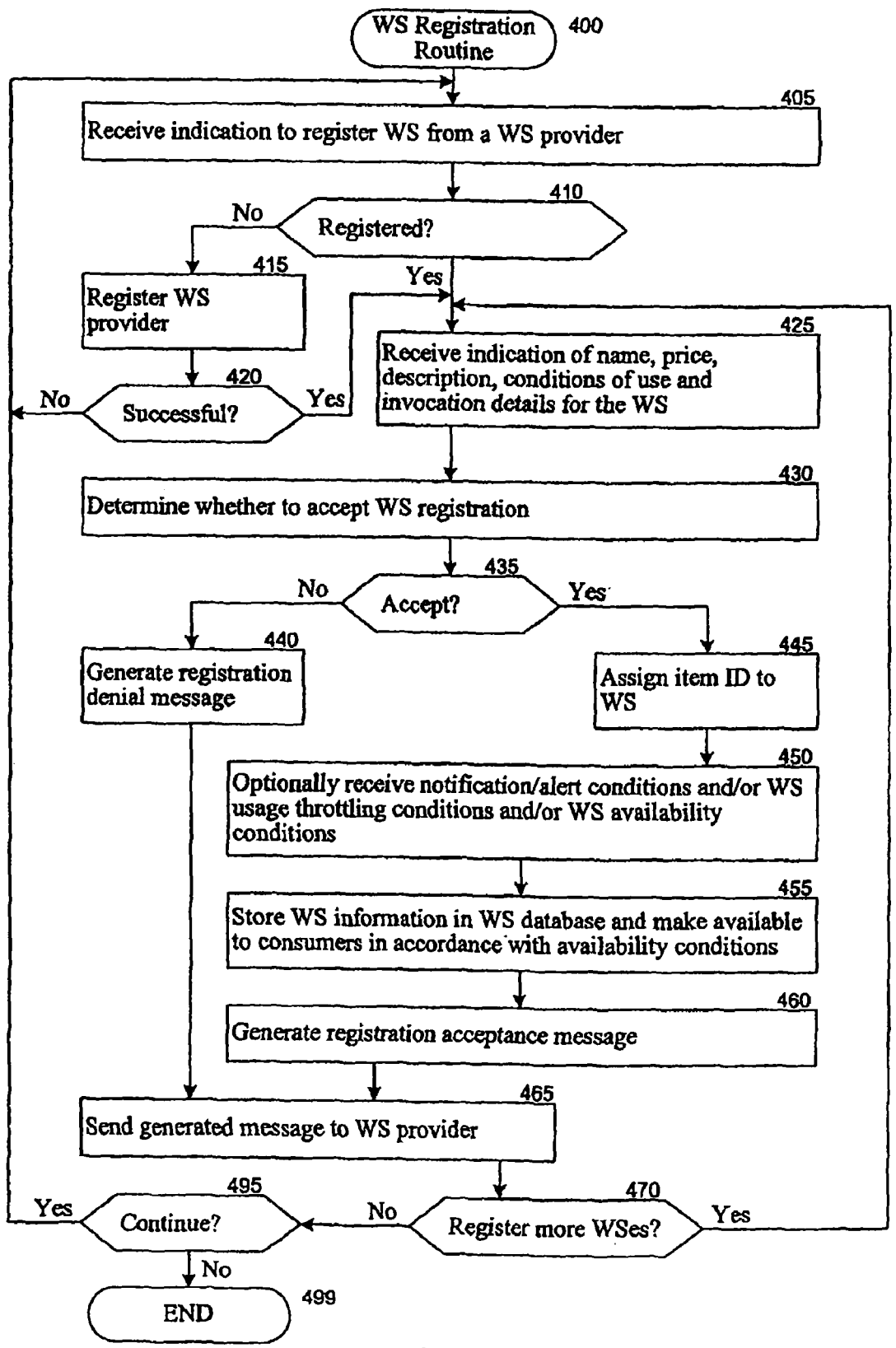
FIG. 4 is a flow diagram of an embodiment of the WS Registration routine.

FIG. 4 is a flow diagram of an embodiment of the WS Registration routine 400. The routine processes requests from WS providers to register WSes at the WSM for use by WS consumers.

The routine begins at step 405 where an indication is received from a WS provider to register a WS. The routine continues in the illustrated embodiment to step 410 to determine whether the WS provider is a registered user of the WSM, and if not continues to step 415 to attempt to register the WS provider (e.g., by obtaining contact information for the WS provider, information about how to provide payment to the WS provider based on use of the provider's registered WSes by WS consumers, etc.). After step 415, the routine continues to step 420 to determine whether the registration of the WS provider was successful. If so, or if it was instead determined in step 410 that the WS provider was already registered as a user (or did not need to be registered as a user), the routine continues to step 425 to receive an indication from the WS provider of various information corresponding to the WS being registered, such as a name, one or more use prices (e.g., as part of one or more usage models being configured), a description for use by potential consumers, other non-price use conditions (e.g., as part of the one or more usage models) and invocation details for the WS. In some embodiments, such information may instead be received as part of step 405. Additional details related to one embodiment of step 425 are illustrated with respect to the WS Usage Model Configuration subroutine shown in FIG. 8.

After step 425, the routine continues to step 430 to determine whether to accept the WS registration, such as based on an automated determination (e.g., on whether appropriate information has been supplied and any predefined criteria had been satisfied) and/or a manual determination (e.g., by a user representing the WSM based on whether the WS is appropriate for the WSM). In step 435, the routine determines whether the registration was accepted, and if not continues to step 440 to generate a registration denial message for the WS provider. If it was instead determined in step 435 that the registration was accepted, the routine continues instead to step 445 to assign a unique item ID to the WS for use by the WSM system in tracking various information related to the WS, although in other embodiments a unique item ID may instead be assigned to each usage model associated with the WS. The routine then continues to step 450 to optionally receive one or more of various types of information related to the WS, such as any use throttling conditions (e.g., limits on how many invocation requests to allow for the service), availability conditions (e.g., times at which the WS is not available or other conditions under which the WS is available or not available), notification conditions related to the WS, etc., although in other embodiments some or all of this information may instead be specified as part of step 425 (e.g., as part of one or more usage models being configured). The routine then continues to step 455 to store the various received information related to the WS in one or more databases as appropriate, and then makes the registered WS available to potential consumers in accordance with any availability conditions. In step 460, the routine then generates a registration acceptance message for the WS provider.

After steps 440 or 460, the routine continues to step 465 to send the generated message to the WS provider, and optionally provides additional information related to the registration (e.g., the assigned item ID). In step 470, the routine then determines whether to register more WSes for this WS provider, and if so returns to step 425. If not, the routine continues to step 495 to determine whether to continue. If so, or if it was instead determined in step 420 that the WS provider registration was not successful, the routine returns to step 405. If the routine instead determines not to continue, the routine continues to step 499 and ends. While not illustrated here, in some embodiments the routine could additionally use various security information and/or mechanisms, such as to ensure that only authorized WS providers can register new WSes. In addition, as previously described, in some embodiments the routine may be provided as part of a user's interaction with a Web site or other interactive interface, while in other embodiments the routine may be performed as part of a programmatically accessed API.

Figure 5:
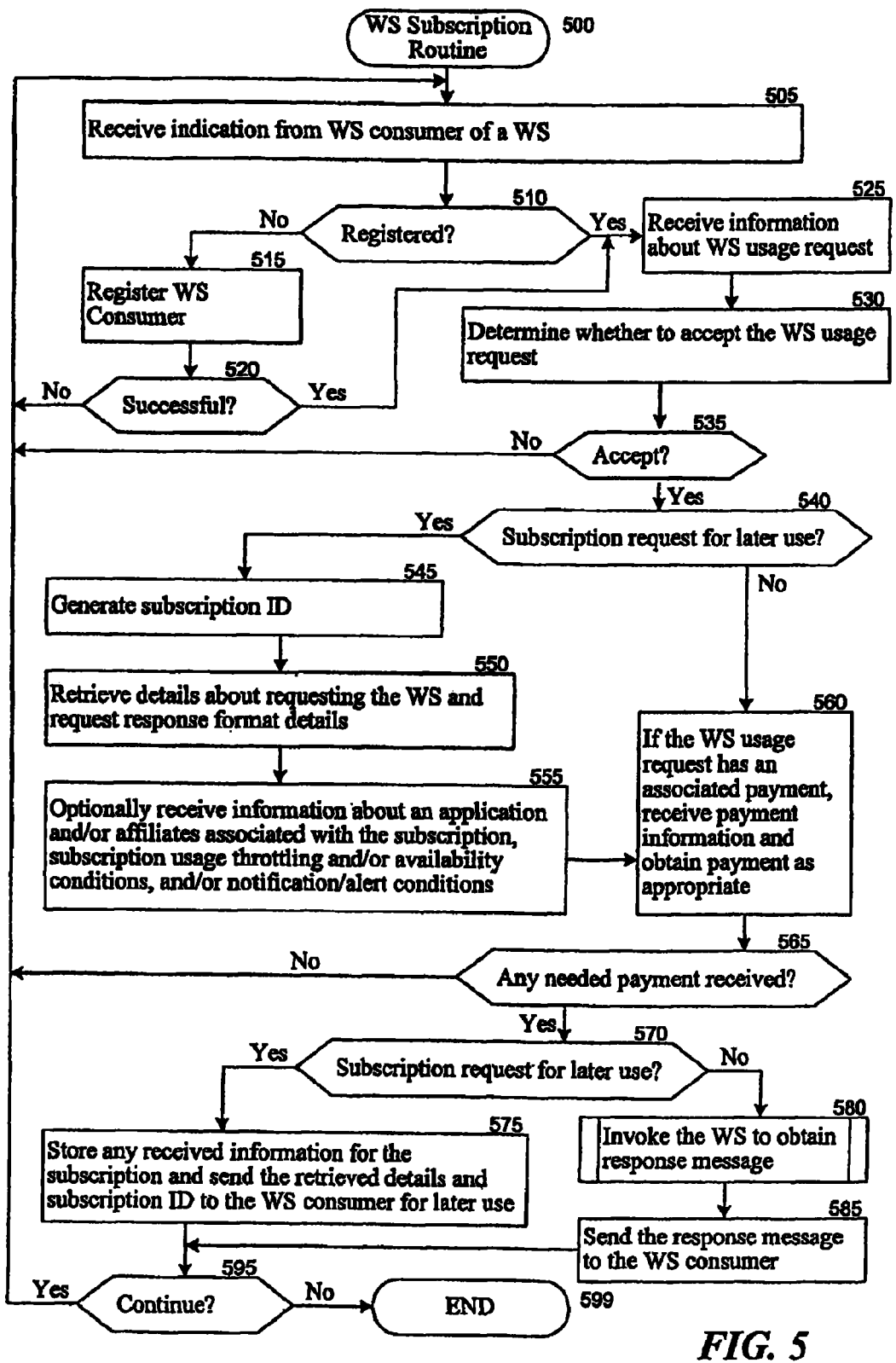
FIG. 5 is a flow diagram of an embodiment of the WS Subscription routine.

FIG. 5 is a flow diagram of an embodiment of the WS Subscription routine 500. The routine receives requests from WS consumers to subscribe to specified WSes, and responds as appropriate. As described in greater detail elsewhere, a WS consumer can identify WSes of potential interest in a variety of ways prior to selecting one or more of those WSes for subscription, such as based on one or more usage models of those WSes. In addition, in the illustrated embodiment a WS consumer can both subscribe to WSes for later access or instead request immediate access without a subscription, although in other embodiments only one of the types of access requests may be provided.

The routine begins at step 505 where an indication is received from a WS consumer of a WS of interest, such as to indicate a selected usage model of the WS (if the WS has more than one usage model available to the consumer). The routine continues to step 510 to determine whether the WS consumer is a registered user of the WSM system, and if not continues to step 515 to attempt to register the WS consumer (e.g., by obtaining contact information, payment source information, information about any associated applications and/or affiliates if the consumer is a developer of one or more application programs, preferences for how to receive information, etc.). The routine then continues to step 520 to determine whether the registration of the consumer was successful. If so, or if it was instead determined in step 510 that the WS consumer was already registered (or that registration of the consumer was not needed), the routine continues to step 525 to receive information about a WS use request from the WS consumer, although in other embodiments such information may instead have been received in step 505. As an example, the WS use request may include an indication of a unique item ID associated with the WS (or with a selected usage model for the WS), an indication of the type of use request (e.g., a subscription request), an indication of a usage model for the WS, preference information for how to receive response information from the WS, payment information if needed for the WS, a type of intended use of the WS, etc.

After step 525, the routine continues to step 530 to determine whether to accept the WS use request, such as based on whether the request contains sufficient appropriate information, on whether any additional information was supplied as configured (e.g. an acceptance of indicated terms of service for the WS), on whether any needed payment can be obtained based on the request or other information for the WS consumer, on whether the WS consumer and/or request satisfies any other specified use conditions for the WS, whether the use request would exceed any throttling condition specified for the WS, etc. The routine continues to step 540 if it was determined in step 535 that the request was accepted in order to determine whether the use request was a subscription request for later use. If so, the routine continues to step 545 to generate a subscription ID corresponding to the subscription for later use by the WS consumer during access requests corresponding to the subscription. In step 550, the routine then retrieves details about how the consumer should request the WS and about the format of any response information. In step 555, the routine then optionally receives one or more of a variety of types of information related to the subscription, such as any notification conditions related to the subscription, any application and/or affiliates associated with the subscription, any subscription use throttling and/or availability conditions (e.g., to restrict it use by affiliates), etc.

After step 555, or if it was instead determined in step 540 that the use request was a non-subscription request for immediate access, the routine continues to step 560 to obtain payment for the subscription or immediate access if needed, such as based on any payment source information received or previously associated with the WS consumer, and/or based on any payment instructions configured by a provider of the WS (e.g., as part of a selected usage model), such as payment aggregation instructions. After step 560, the routine continues to step 565 to determine whether any needed payment was received, and if so continues to step 570 to again determine whether the use request was a subscription for later use. If so, the routine continues to step 575 to store any received information for the subscription and to send the generated subscription ID and the retrieved details about how to request the WS to the WS consumer for later use. If it was instead determined in step 570 that the use request was a non-subscription request for immediate access, the routine continues to step 580 to execute a routine to invoke the Web service to obtain response information as appropriate, although in other embodiments the routine may instead facilitate access to the WS in other manners. In step 585, any response information received in step 580 is then sent to the WS consumer.

After steps 575 or 585, the routine continues to step 595 to determine whether to continue, and if not continues to step 599 and ends. If it was instead determined in step 595 to continue, or in step 520 that the WS consumer registration was not successful, or in step 535 that the WS use request was not accepted, or in step 565 that any needed payment was not received, the routine returns to step 505.

As with the WS registration routine, the illustrated routine can be provided in various ways in various embodiments, including as part of an interactive Web site with which a WS consumer user interacts and/or as part of a programmatically accessed API. In addition, while not illustrated here, in some embodiments various security information and/or mechanisms may be used, such as to ensure that only authorized WS consumers are allowed to subscribe to some or all WSes and/or to perform immediate WS access requests without subscriptions. Additionally, while not illustrated here, in some embodiments various anti-fraud mechanisms may be utilized, such as to ensure that no unauthorized people are using a WS consumer's account or to prevent abuse of a usage model through multiple accounts or violations of the use conditions.

Figure 6:
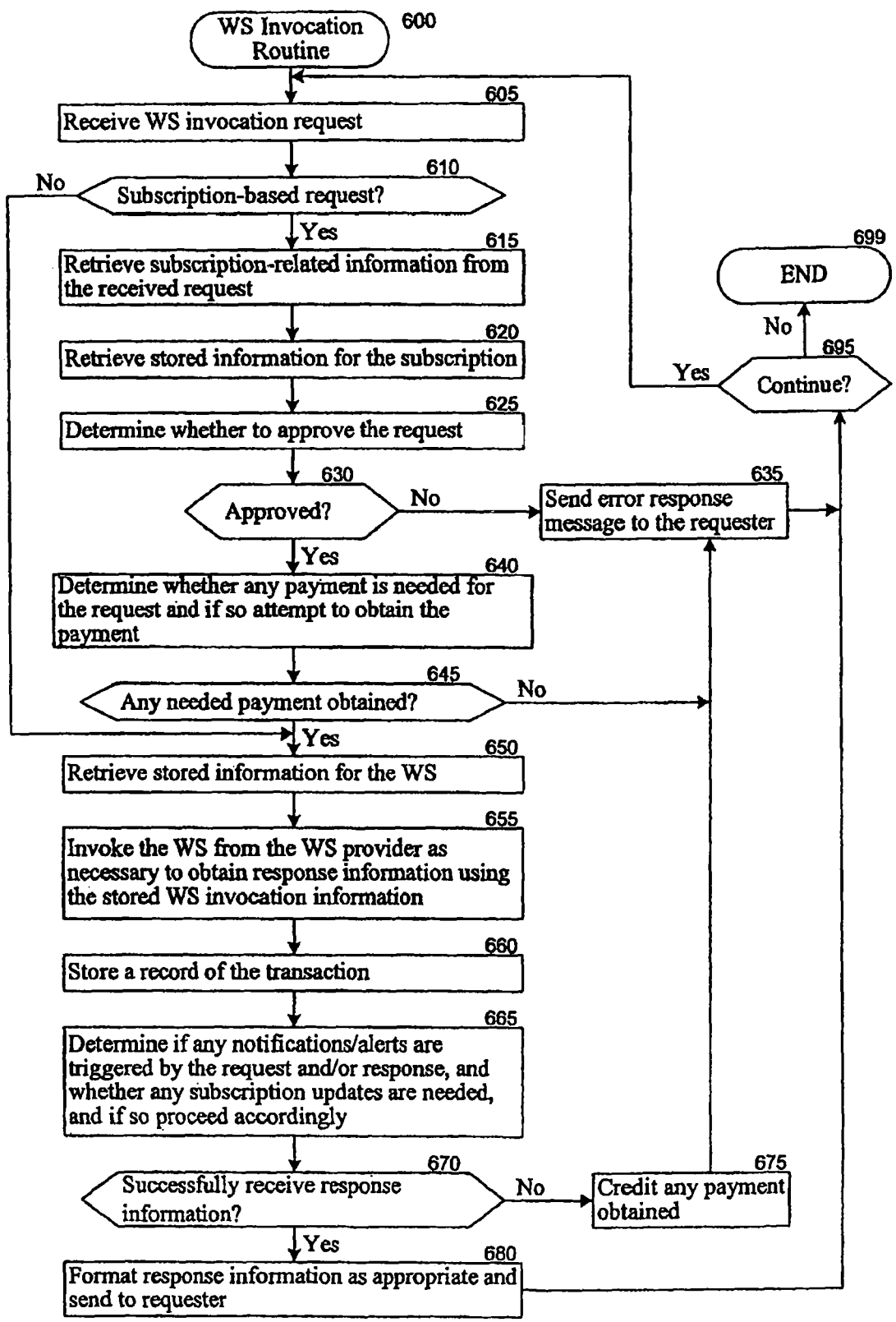
FIG. 6 is a flow diagram of an embodiment of a WS Invocation routine.

FIG. 6 is a flow diagram of an embodiment of a WS Invocation routine 600. The routine receives access requests for WSes from consumers, and responds by providing access to the WSes via invocations of the WSes on behalf of the consumers when appropriate.

The routine begins at step 605 where a WS access request is received, such as based on a previously created subscription (e.g., based on a selected usage model). The routine continues to 610 to determine whether the access request is a subscription-based request (e.g., based on whether a subscription ID is received as part of the request) or instead if an indication is received that the access request is for immediate invocation without a subscription (e.g., such as based on a message received from the WS Subscription routine illustrated in FIG. 5 as part of the execution of step 580).

If it is determined in step 610 that the WS invocation request is a subscription-based request, the routine continues to step 615 to retrieve subscription-related information from the received request, such as an indication of the subscription ID for the subscription (e.g., based on a corresponding usage model) and of the identity of the WS consumer. In step 620, the routine then retrieves stored information for the subscription and any corresponding usage model, and in step 625 determines whether to approve the request, such as based on whether the subscription is valid (including whether any corresponding use conditions are currently satisfied), whether any current subscription-based throttling conditions and/or WS-based throttling conditions are satisfied, whether the requesting user is authorized to use the subscription in the requested manner (e.g., is an authorized affiliate for the subscription), etc. If it is determined in step 630 that the request is not approved, the routine continues to step 635 to send an error response message to the requester and to store information about the error, but otherwise continues to step 640 to determine whether any payment is needed for the request, and if so to attempt to obtain the payment (e.g., for purchased subscriptions in which an additional per-access charge applies, or for subscriptions that a WS consumer has established such that affiliates using the subscription provide their own payment for their use) in a manner so as to reflect any payment-related instructions configured by the provider of the WS. As discussed elsewhere, payment can be obtained in various ways in various embodiments, including by dynamically purchasing a subscription or other access (e.g., as a credit card transaction), via use of previously acquired WSM points, etc. If it is determined in step 645 that needed payment is not obtained, the routine continues to step 635.

If it is instead determined in step 645 that any needed payment is obtained, or in step 610 that the received request was not a subscription-based request, the routine continues instead to step 650 to retrieve stored information for the WS including information about how to invoke the WS. The routine then continues to step 655 to invoke the WS from the WS provider as necessary to obtain response information using the retrieved WS invocation information. While not illustrated here, in some embodiments retrieved information may be stored in a cache or other storage mechanism, and such cached/stored information may be considered for use rather than invoking the WS from a WS provider. In addition, in some embodiments step 655 may be performed regardless of the validation actions in step 625 as to whether to approve the request and in step 645 whether any needed payment was obtained, such as to perform step 655 in parallel with such validation steps and to handle any failure of those steps by not providing to the requester any response information and/or other benefits resulting from the WS invocation. After step 655, the routine continues to step 660 to store a record of the WS access transaction.

In step 665, the routine then determines if any notification conditions have been triggered by the request and/or response, as well as whether any other updates are needed (e.g., to update a subscription after the last authorized use has been made so that any next attempt to use a subscription would fail), and if so the routine proceeds accordingly to provide such notifications and/or perform such updates. After step 665, the routine continues to step 670 to determine whether response information was successfully received from the WS service invocation, and if not continues to 675 to credit any payment obtained in step 640 before continuing to step 635 (in other embodiments, payment may not be obtained until after successful invocation to prevent such payment credits, or instead payment may be retained even if the invocation fails). If it is determined in step 670 that response information was successfully received, the routine continues to step 680 to format the response information as appropriate for the requester (e.g., based on previously specified preferences, to remove details about invocation of the service, etc.), and then sends the formatted response information to the requester. After steps 635 or 680, the routine continues to step 695 to determine whether to continue. If so, the routine returns to step 605, and if not the routine continues to step 699 and ends.

As with the registration and subscription routines, the WS Invocation routine can be performed in various ways in various embodiments, such as part of an interactive Web site in response to an explicit user request or instead as part of a programmatically accessed API. In addition, in some embodiments various security information and/or mechanisms may be employed, such as to ensure that only authorized WS consumers are able to invoke WSes and that any WS to be invoked is from an authorized WS provider. In addition, in some embodiments the information provided to a WS consumer about how to request a WS invocation and any invocation response information returned to the WS consumer is formatted in such a way as to obfuscate or mask various types of information, such as the details about how to perform the actual invocation request to the WS provider and/or identity or other information about the WS provider— in this way, the WSM system is able to ensure that any invocation request to WS providers come from the WSM system and are thus authorized. Alternatively, in other embodiments, the WSM system may not serve as an intermediary for the invocation of some or all WSes, such as by providing to WS consumers the details about how to directly interact with a WS provider to invoke a subscribed-to or otherwise access-approved WS. For example, in some embodiments, when a WS consumer has purchased or otherwise acquired access to a WS, the WSM system could provide access authorization information to the consumer to allow the consumer to obtain access to the WS directly from the provider of the WS, such as details about how to access the WS and/or a token or other indication that the WS provider can identify (and optionally verify) as having being supplied by the WSM system when the provider receives the information from the WS consumer (e.g., a digital signature; information indicating vending payment to the WSM, such as transferable WSM points that can be used by the WS provider to receive compensation from the WSM system; etc.).

Figure 7:
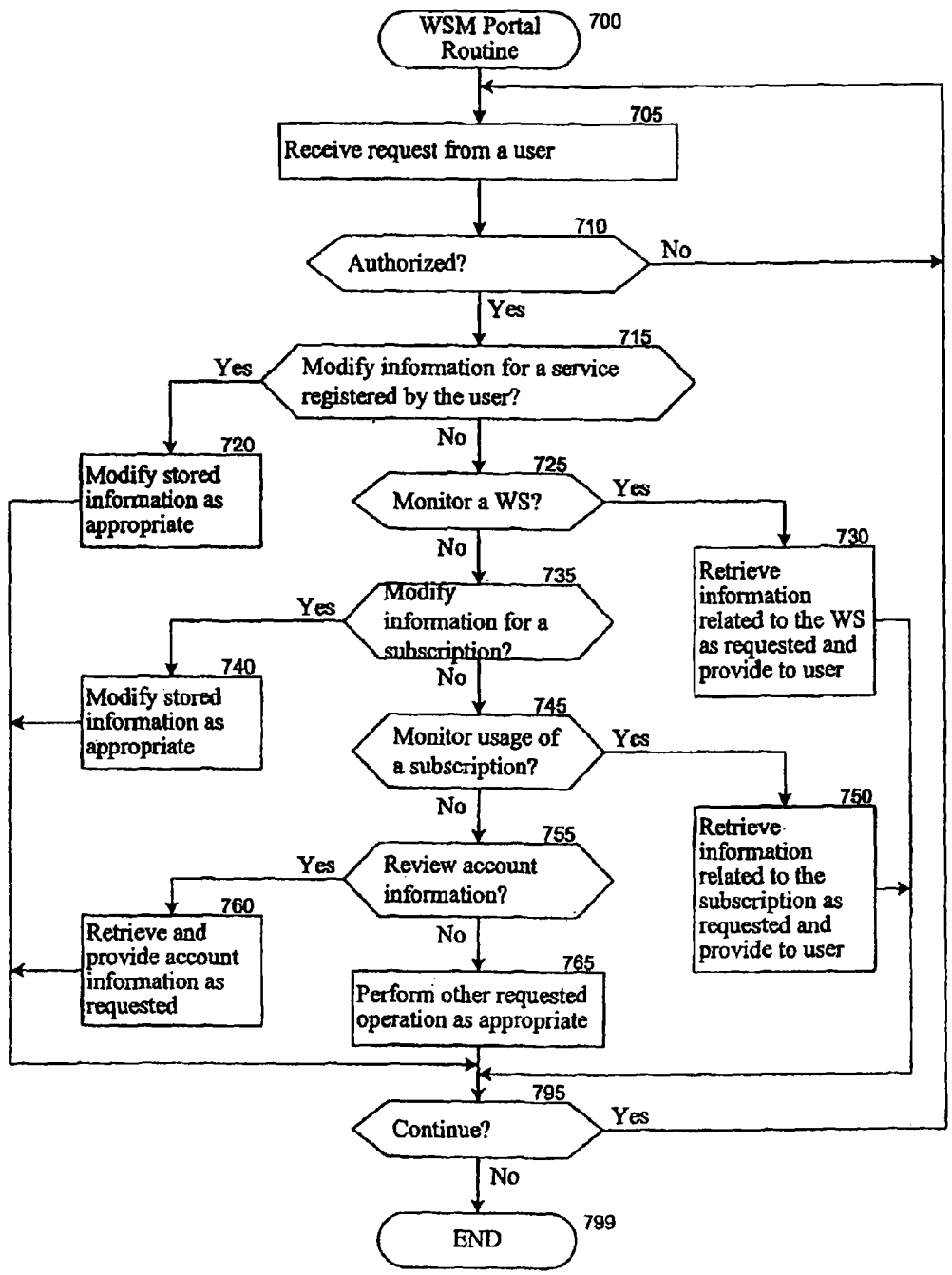
FIG. 7 is a flow diagram of the WSM Portal routine.

FIG. 7 is a flow diagram of the WSM Portal routine 700. The routine allows WS providers and/or WS consumers to interact with the WSM system to monitor WS status and use and to manage registered WSes, subscriptions and configured usage models.

The routine begins at step 705, where a request is received from a user. In step 710, the routine determines whether the user is authorized to make the request, such as based on security information and associated access privileges for the user. If it is determined that the user and request are authorized, the routine continues to step 715 to determine whether the request is from a WS provider user to modify information for a WS registered by the user, and if so continues to step 720 to modify the stored information as appropriate. If it was instead determined that the request was not to modify information for a registered WS, the routine continues instead to step 725 to determine whether the request was to monitor a Web service (e.g., from the Web service provider user that registered the WS), and if so continues to step 730 to retrieve information related to the WS as requested and provide it to the user (e.g., information about current status of the WS and/or usage of the WS).

If it was determined that the received request was not to monitor a WS, the routine continues instead to step 735 to determine whether the request was from a WS consumer user to modify a subscription for the user, and if so continues to step 740 to modify the stored information as appropriate. If the request was not to modify information for a subscription, the routine continues instead to step 745 to determine whether the request is to monitor use of a subscription (e.g., from a WS consumer that created the subscription), and if so continues to step 750 to retrieve information related to the subscription as requested and provide it to the user (e.g., information about use of a subscription by affiliates).

If it was instead determined that the request was not to monitor use of a subscription, the routine continues to step 755 to determine whether the request was to review account information for the user, and if so continue to step 760 to retrieve and provide account information to the user as requested. If the request was not to review account information, the routine continues instead to step 765 to perform another requested operation if appropriate, such as to modify the user's account (e.g., by purchasing additional WSM points or otherwise providing additional payment information), or to modify a usage model for a WS based on instructions received from a provider of the WS. After steps 720, 730, 740, 750, 760 or 765, the routine continues to step 795 to determine whether to continue. If so, the routine continues to step 705, if not the routine continues to step 799 and ends.

As previously described with respect to other routines, the WSM Portal routine may be provided in various ways in various embodiments, including as part of an interactive Web site with which the user interacts and/or as part of a programmatically accessed API. In addition, various security mechanisms may be provided to ensure that users are authorized to obtain the information requested and/or to make the requested modifications to information. Also various fraud mechanisms may in some embodiments be provided to facilitate detection of abuse of usage models (e.g. by allowing unauthorized people to use a subscription based on a usage model), detection of unauthorized or unusual activity regarding a user's account, and/or detection of violations of terms for a usage model.

Figure 8:
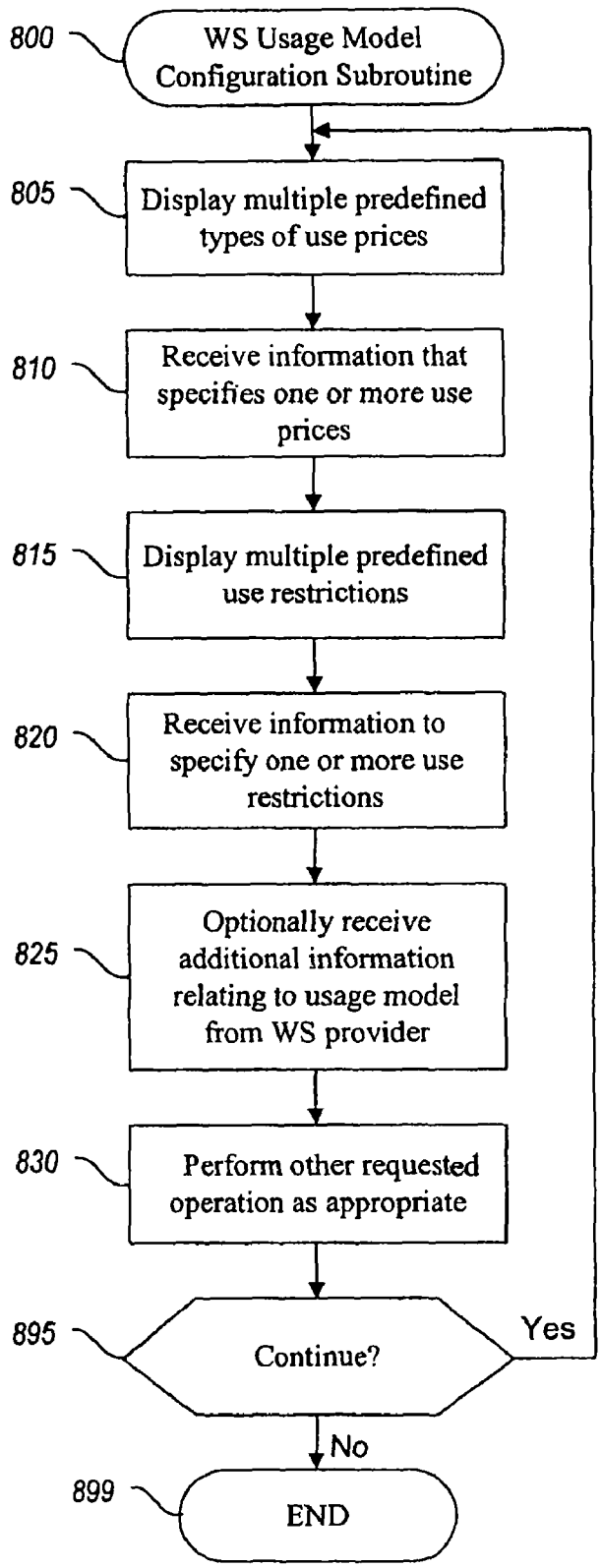
FIG. 8 is a flow diagram of an embodiment of a WS Usage Model Configuration subroutine.

FIG. 8 is a flow diagram of an embodiment of a WS Usage Model Configuration subroutine 800. The subroutine allows WS providers to configure one or more usage models for their WSes, such as during registration of the WSes. In this illustrated example, the usage model configuration is performed in an interactive manner, although in other embodiments it may be performed in other manners. The subroutine may be executed at various times, such as to correspond to step 425 of FIG. 4.

The subroutine begins at step 805, where multiple predefined types of use prices are displayed to a WS provider user, and in step 810 information is received that indicates one or more use prices of one or more of the predefined types that are specified by the user for a usage model being configured for a WS. Multiple use prices may be used in various situations, such as for tiered models, models whose prices vary based on other types of conditions (e.g., peak and non-peak prices), etc. In step 815, the subroutine displays multiple predefined types of use restrictions or other use conditions are to the user, and in step 820 information is received that indicates one or more use conditions of one or more of the predefined types that are specified by the user for the usage model being configured. In other embodiments, multiple predefined use price types and/or multiple predefined use conditions types may instead not be used.

At step 825, additional information for the usage model may optionally be received by the subroutine from the WS provider user for use as part of the usage model, such that access to the WS using the usage model will be performed in accordance with the specified additional information. A variety of types of additional information may be specified in various embodiments, including quality-of-service levels to be provided, payment aggregation instructions, timing for obtaining multiple payments, information regarding how a tier-based model is structured (such as the start and end of various tiers, whether the tiers are cumulative, etc.), allowed payment methods for providing payment to obtain access to the WS, times when the WS is not available to consumers (e.g. for scheduled maintenance, data update, etc.), information to be provided to and/or obtained from consumers, temporary promotions, bundling instructions, discounts to be provided via discount coupons to be used (e.g., with the coupons represented by a single discount code or each represented by a distinct discount code), etc. At step 830, the subroutine then performs additional processing as appropriate, such as to confirm information received for the usage model, to store information about the usage model (e.g., temporarily while waiting for approval in step 430 of FIG. 4, to allow multiple related usage models to be configured, such as to include at least some shared information, etc.). After step 830, the subroutine continues to step 895 to determine whether to continue, such as to configure additional usage models for the WS. If so, the routine returns to step 805, and if not continues to step 899 and ends.

Various other types of functionality relating to pricing and usage may similarly be provided in at least some embodiments. In addition, those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium whose stored contents cause a computing system to configure access to invocable services, by performing a method comprising:
receiving an indication of a service from a provider that is to be made available to others for remote invocation;
automatically configuring multiple distinct access control groups for use in controlling access of others to the indicated service, the automatic configuring being performed by the computing system and including,
providing information for display to the provider to indicate multiple options for use prices, wherein the multiple indicated use price options include multiple user-selectable predefined types of use prices; and
for each of the groups, determining one or more use conditions for the group and determining a use price for the group that is to be charged for use of the indicated service by others who select the group, wherein the determining of the use price for the group is based at least in part on one or more selections made by the provider of one or more of the indicated multiple use price options, the determined use price being of one of the multiple predefined types of use prices based at least in part on the one or more selections made by the provider; and
facilitating access to the indicated service for remote invocation by others in accordance with the multiple configured access control groups.

2. The non-transitory computer-readable medium of claim 1 wherein each of the multiple access control groups is a configured usage model.

3. The non-transitory computer-readable medium of claim 2 wherein the facilitating of the access to the indicated service for remote invocation by others in accordance with the multiple configured usage models includes, for each received request to invoke the indicated service in accordance with one of the multiple usage models, verifying that the one or more use conditions for the one usage model are satisfied and verifying that payment is available for the use price for the one usage model.

4. The non-transitory computer-readable medium of claim 3 wherein the facilitating of the access to the indicated service for remote invocation by others in accordance with the multiple configured usage models further includes, after verifying for a received request from a user based on use of one of the usage models that the one or more use conditions for the one usage model are satisfied and verifying that payment is available for the use price for the one usage model, invoking the indicated service on behalf of the user and providing a response from the invoking to the user.

5. The non-transitory computer-readable medium of claim 2 wherein the configuring of the multiple distinct usage models for the indicated service includes displaying information to the provider to indicate multiple options for use conditions, and wherein the determining of at least one of the use conditions for one of the usage models is based at least in part on one or more selections made by the provider of one or more of the indicated use condition options such that the determined at least one use conditions are to restrict use of the indicated service by others who select the one usage model.

6. The non-transitory computer-readable medium of claim 5 wherein the multiple indicated options for use conditions include multiple user-selectable predefined types of use conditions, and wherein the determined at least one use conditions for the one usage model are each of one of the multiple predefined types of use conditions based at least in part on one or more selections made by the provider of those use condition types such that the determined at least one use conditions of the one or more selected use condition types are to restrict use of the indicated service in manners based on those use condition types.

7. The non-transitory computer-readable medium of claim 1 wherein the indicated service is a Web service that is available for remote invocation by users who are unrelated to the provider.

8. The non-transitory computer-readable medium of claim 1 wherein the computer-readable medium is a memory of the computing system.

9. The non-transitory computer-readable medium of claim 1 wherein the contents are instructions that when executed program the computing system to perform the method.

10. The non-transitory computer-readable medium of claim 1 wherein the contents include one or more data structures comprising multiple entries that each correspond to one of multiple types of use prices and multiple types of use conditions.

11. A computing device configured to facilitate access to invocable services, comprising:
one or more processors;
a first component configured to, when executed by at least one of the one or more processors, and for each of multiple services available for invocation, determine multiple distinct usage models for use in controlling access of others to the service such that each usage model has one or more use restrictions and has a use price to be charged for use of the service by others who select the usage model, the determining of the multiple distinct usage models for the service including:
presenting information to a user to indicate multiple options for use prices, wherein the multiple indicated use price options include multiple user-selectable predefined types of use prices; and
receiving one or more indications of selections by the user of at least one of the use price options, wherein the use price for each of the usage models of the service is of one of the multiple predefined types of use prices and is determined based at least in part on the one or more indicated selections by the user; and
a second component configured to, when executed by at least one of the one or more processors, and for each of multiple received requests to invoke one of the multiple services by a user, facilitate access to the one service by the user if the use restrictions of one of the multiple usage models for the one service are satisfied and if payment is available for the use price of the one usage model.

12. The computing device of claim 11 wherein the determining of the multiple distinct usage models for a service includes presenting information to a user to indicate multiple options for use restrictions, and receiving one or more indications of selections by the user of at least one of the use restriction options.

13. The computing device of claim 12 wherein the multiple indicated options for use restrictions include multiple user-selectable predefined types of use restrictions, and wherein the determined use restrictions for one of the usage models of one of the services include one or more use restrictions that are each of one of the multiple predefined types of use restrictions.

14. The computing device of claim 11 wherein the use restrictions of a usage model for a service are to restrict use of the service by others who select that usage model, and wherein the use price of a usage model for a service is to be charged for use of the service by others who select that usage model.

15. The computing device of claim 11 wherein the multiple services available for invocation are each a Web service that is available for remote invocation from a provider by users who are unrelated to the provider.

16. The computing device of claim 11 wherein the first component is an interface component of a services marketplace, wherein the second component is a service access controller component, and wherein the first and second components each include software instructions for execution in memory of the computing device.

17. The computing device of claim 11 wherein the first component consists of a means for, for each of multiple services available for invocation, determining multiple distinct usage models for use in controlling access of others to the service such that each usage model has one or more use restrictions and has a use price to be charged for use of the service by others who select the usage model, and wherein the second component consists of a means for, for each of multiple received requests to invoke one of the multiple services by a user other than a provider of the one service in accordance with one of the multiple usage models for the one service, facilitating access to the one service by the user if the use restrictions of the one usage model are satisfied and if payment is available for the use price of the one usage model.

18. A computer-implemented method for facilitating access to invocable services, the method comprising:

for each of multiple services available for invocation, determining multiple distinct usage models for use in controlling access of others to the service, each usage model having one or more use restrictions and having a use price to be charged for use of the service by others who select the usage model, wherein the determining of the multiple distinct usage models for one of the multiple services includes presenting information to a user to indicate multiple options for use prices, the multiple indicated use price options including multiple user-selectable predefined types of use prices, and includes receiving one or more indications of selections by the user of at least one of the multiple predefined types of use prices for one of the indicated use price options, and wherein the use price for each of the determined usage models for the one service is of one of the multiple predefined types of use prices and is based at least in part on the one or more indicated selections made by the user; and for each of multiple received requests to invoke one of the multiple services by a user in accordance with one of the multiple usage models for the one service, automatically facilitating access of the user to the one service by one or more configured computing systems, the automatically facilitating included determining that the use restrictions of the one usage model are satisfied and that payment is available for the use price of the one usage model.

19. The method of claim 18 wherein the determining of the multiple distinct usage models for one of the multiple services further includes presenting information to the user to indicate multiple options for use restrictions, the multiple indicated options for use restrictions including multiple user-selectable predefined types of use restrictions, and includes receiving one or more indications of selections by the user of at least one of the multiple predefined types of use restrictions for one of the use restriction options.

20. The method of claim 19 wherein the one service is a Web service that is available for remote invocation from a provider by users who are unrelated to the provider, wherein the use restrictions of each of the multiple usage models for the one service are to restrict use of the one service by users who select that usage model, and wherein the use price of each of the multiple usage models for the one service is to be charged for use of the one service by users who select that usage model.

* * * * *

UNITED STATES PATENT AND TRADEMARK OFFICE
CERTIFICATE OF CORRECTION

PATENT NO. : 8,005,723 B1
APPLICATION NO. : 12/825241
DATED : August 23, 2011
INVENTOR(S) : Peter Sirota et al.

It is certified that error appears in the above-identified patent and that said Letters Patent is hereby corrected as shown below:

On the title page Item 75:
"Peter Sirota, Seattle, WA (US); Guarav D. Ghare, Seattle, WA (US); Don Johnson, Seattle, WA (US); Tushar Jain, Bellevue, WA (US); Robert Frederick, Seattle, WA (US); Ashish Agrawal, Bangalore (IN); Jeffrey Barr, Sammamish, WA (US)" should read, --Peter Sirota, Seattle, WA (US); Gaurav D. Ghare, Seattle, WA (US); Don Johnson, Seattle, WA (US); Tushar Jain, Bellevue, WA (US); Robert Frederick, Seattle, WA (US); Ashish Agrawal, Bangalore (IN); Jeffrey Barr, Sammamish, WA (US)--.

Page 2, col. 1, line 25, Item 56:
"Actional™, the Web Services Management Platform: Managing the Impact of Change in an Enterprise Web Services Network – March 2003, retrieved November 7, 2003, from http://www.actional.com/down-loads/products/managing.enterpriseweb.services.network.pdf, 26 pages." should read, --Actional™, the Web Services Management Platform: Managing the Impact of Change in an Enterprise Web Services Network – March 2003, retrieved November 7, 2003, from http://www.actional.com/downloads/products/managing.enterpriseweb.services.network.pdf, 26 pages.--.

Page 2, col. 2, line 14, Item 56:
"Burbeck, "The Tao of E-Business Services – The Evolution of Web Applications Into Service-Oriented Components With Web Services" October 2000, IBM®, http://www.4.ibm.com/software/devel-oper/library/ws-tao/index.html, 13 pages." should read, --Burbeck, "The Tao of E-Business Services – The Evolution of Web Applications Into Service-Oriented Components With Web Services" October 2000, IBM®, http://www.4ibm.com/software/developer/library/ws-tao/index.html, 13 pages.--.

Page 2, col. 2, line 27, Item 56:
"CPA2Biz, Inc., "New Rivio Business Services Suite" April 18, 2001, retrieved September 8, 2005, from https://www.epa2biz.com/Corp/Press+Releases/PR_WebTools_18APR01.htm, 3 pages." should read, --CPA2Biz, Inc., "New Rivio Business Services Suite" April 18, 2001, retrieved September 8, Signed and Sealed this
Fifteenth Day of November, 2011

David J. Kappos
*Director of the United States Patent and Trademark Office*

CERTIFICATE OF CORRECTION (continued)
U.S. Pat. No. 8,005,723 B1

2005, from https://www.cpa2biz.com/Corp/Press+Releases/PR_WebTools_18APR01.htm, 3 pages.--.

Page 2, col. 2, line 36, Item 56:
"E2OPEN™, The E2open Integration Platform, retrieved November 7, 2003, from http://www.e2open.com/downloads/e2open_integra-tion_platform_datasheet.pdf, 5 pages." should read, --E2OPEN™, The E2open Integration Platform, retrieved November 7, 2003, from http://www.e2open.com/downloads/e2open_integration_platform_datasheet.pdf, 5 pages.--.

Page 2, col. 2, line 65, Item 56:
"Radding, "Generating Revenue from Web Services – Six Vendors With the Right Tools" January 20, 2003, retrieved from, http://72.14.207.104/search?q=cache:W5EXBA4Lr54J:home.comcast.net/~alanrad-ding.iaws.pdf+generating+revenue+from+web+services+radding&hl=en&gl=us&ct=clnk&cd=3, 4 pages." should read, --Radding, "Generating Revenue from Web Services – Six Vendors With the Right Tools" January 20, 2003, retrieved from, http://72.14.207.104/search?q=cache:W5EXBA4Lr54J:home.comcast.net/~alanradding.iaws.pdf+generating+revenue+from+web+services+radding&hl=en&gl=us&ct=cink&cd=3, 4 pages.--.

Page 3, col. 1, line 34, Item 56:
"Sterling Commerce, Sterling Information Broker, retrieved November 10, 2003, from http://www.sterlingcommerce.com/solutions/em/com-merce/iibs.html, 3 pages." should read, --Sterling Commerce, Sterling Information Broker, retrieved November 10, 2003, from http://www.sterlingcommerce.com/solutions/em/commerce/iibs.html, 3 pages.--.

Page 3, col. 2, line 26, Item 56:
"WESTBLOBAL, Products-Revenue Management Module, retrieved November 7, 2003, from http://www.westglobal.com/products/mscpace_revman.htm, 3 pages." should read, --WESTGLOBAL, Products-Revenue Management Module, retrieved November 7, 2003, from http://www.westglobal.com/products/mscpace_revman.htm, 3 pages.--.